(12) United States Patent
Oono et al.

(10) Patent No.: US 10,049,242 B2
(45) Date of Patent: Aug. 14, 2018

(54) INFORMATION PROCESSING METHOD AND NON-TRANSITORY RECORDING MEDIUM

(71) Applicant: Panasonic Intellectual Property Management Co., Ltd., Osaka (JP)

(72) Inventors: Atsuko Oono, Kyoto (JP); Mitsuhiro Aso, Osaka (JP); Yoshiyuki Mochizuki, Osaka (JP); Yasuhiro Yuki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/612,499

(22) Filed: Jun. 2, 2017

(65) Prior Publication Data
US 2017/0357835 A1   Dec. 14, 2017

(30) Foreign Application Priority Data

Jun. 8, 2016  (JP) .................................. 2016-114878
Feb. 15, 2017  (JP) .................................. 2017-026207

(51) Int. Cl.
*G06F 19/00*   (2018.01)
*G06K 7/10*   (2006.01)
(Continued)

(52) U.S. Cl.
CPC ..... *G06K 7/10386* (2013.01); *G06K 17/0022* (2013.01); *G09B 19/0092* (2013.01);
(Continued)

(58) Field of Classification Search
CPC .......... G06K 7/10386; G06K 17/0022; G06K 2007/10524; G09B 5/02; G09B 19/0092
(Continued)

(56) References Cited

U.S. PATENT DOCUMENTS

| | | | |
|---|---|---|---|
| 6,982,640 B2 * | 1/2006 | Lindsay | G06K 17/0022 340/10.1 |
| 7,292,146 B1 * | 11/2007 | Nguyen | F25D 29/00 340/3.1 |

(Continued)

FOREIGN PATENT DOCUMENTS

JP   2015-125535   7/2015

*Primary Examiner* — Claude J Brown
(74) *Attorney, Agent, or Firm* — Greenblum & Bernstein, P.L.C.

(57) ABSTRACT

An information processing method causes a processor in a terminal to: display, on the display of the terminal, a first screen representing a pre-preparation process included in cooking processes, the first screen displaying information indicating an intermediate foodstuff made through the pre-preparation process; acquire first identification information indicating a food container storing the intermediate foodstuff from an electronic tag apparatus attached to the food container while the first screen is displayed on the display; store, in a memory, information indicating the intermediate foodstuff or pre-preparation process and the first identification information in correspondence with each other; display, on the display, a second screen representing a finish process included in the cooking processes, the intermediate foodstuff being prepared in the finish process; and when the second screen is displayed, transmit a command to the electronic tag apparatus according to the first identification information so that the user discriminates the food container.

9 Claims, 18 Drawing Sheets

(51) Int. Cl.
  *G06K 17/00* (2006.01)
  *G09B 19/00* (2006.01)
  *H04N 5/445* (2011.01)
  *H04L 12/28* (2006.01)

(52) U.S. Cl.
  CPC ......... *H04L 12/2803* (2013.01); *H04N 5/445* (2013.01); *G06K 2007/10524* (2013.01)

(58) Field of Classification Search
  USPC ....................................................... 235/385
  See application file for complete search history.

(56) References Cited

U.S. PATENT DOCUMENTS

| | | | |
|---|---|---|---|
| 9,355,096 B1* | 5/2016 | Brahmbhatt | G06K 7/10297 |
| 2002/0139848 A1* | 10/2002 | Catan | G06Q 99/00 |
| | | | 235/385 |
| 2009/0237223 A1* | 9/2009 | Zimmerman | G06K 19/0707 |
| | | | 340/10.51 |
| 2011/0012713 A1* | 1/2011 | Wilkinson | G06K 7/10178 |
| | | | 340/10.3 |
| 2012/0136864 A1* | 5/2012 | Ochtel | G06Q 30/0633 |
| | | | 707/738 |
| 2014/0332289 A1* | 11/2014 | Gallagher, Jr. | G01G 19/414 |
| | | | 177/1 |
| 2016/0054049 A1* | 2/2016 | Harvie | B65D 81/2015 |
| | | | 426/383 |
| 2017/0150843 A1* | 6/2017 | Rosalia | A47J 27/13 |
| 2017/0221296 A1* | 8/2017 | Jain | G07D 11/0039 |
| 2017/0270326 A1* | 9/2017 | Anderson | G06K 19/07745 |

* cited by examiner

| IDENTIFICATION INFORMATION | INTERMEDIATE FOODSTUFF INFORMATION |
|---|---|
| 001 | A-01 |
| 002 | A-02 |
| 003 | B-01 |
| 004 | |
| 005 | |
| ⋮ | ⋮ |

INFORMATION PROCESSING METHOD AND NON-TRANSITORY RECORDING MEDIUM

BACKGROUND

1. Technical Field

The present disclosure relates to an information processing method that manages information about intermediate foodstuffs made in pre-preparation for cooking and to a non-transitory recording medium recording a program that implements the method.

2. Description of the Related Art

Information about cooking recipes useful for performing pre-preparation for weekday cooking for dinners on a holiday at one time is available from the Internet and other sources. Intermediate foodstuffs made in pre-preparation on a holiday are used on weekdays to finish cooking for a dinner. This completes the cooking of a dinner. Therefore, the intermediate foodstuffs are stored in a food container from the day of pre-preparation for cooking to the day to finish cooking for a dinner.

Japanese Unexamined Patent Application Publication No. 2015-125535 discloses a management system that manages articles in a food cabinet. Even if no integrated circuit (IC) tag is attached to an article, this management system determines whether the article has been placed in a food cabinet or has been taken out of it according to whether the weight of the article has been increased or decreased. The management system uses an image of the article to update article management information.

SUMMARY

In the conventional technology described above, however, a further improvement has been needed. In one general aspect, the techniques disclosed here feature causing a processor in an information terminal to: display, on a display of the information terminal, a first display screen representing a pre-preparation process included in a plurality of cooking processes, the first display screen displaying foodstuff information indicating an intermediate foodstuff made through the pre-preparation process; acquire first identification information indicating a food container in which the intermediate foodstuff is stored from an electronic tag apparatus attached to the food container while the first display screen is displayed on the display; store, in a memory, (i) foodstuff information and the first identification information or (ii) process information and the first identification information, the foodstuff information or the process information being associated with the first identification information in the memory, the foodstuff information indicating the intermediate foodstuff, and the process information indicating the pre-preparation process; display, on the display, a second display screen representing a finish process included in the plurality of cooking processes, the intermediate foodstuff being prepared in the finish process; and when the second display screen is displayed, transmit a command to the electronic tag apparatus according to the first identification information, the command causing the electronic tag apparatus to perform an operation for allowing a user to discriminate the food container.

The information processing method in one aspect of the present disclosure can reduce a load on a cook who manages intermediate foodstuffs made in pre-preparation for cooking.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 illustrates an example of correspondence information in the first embodiment;

DETAILED DESCRIPTION

Figure 1:
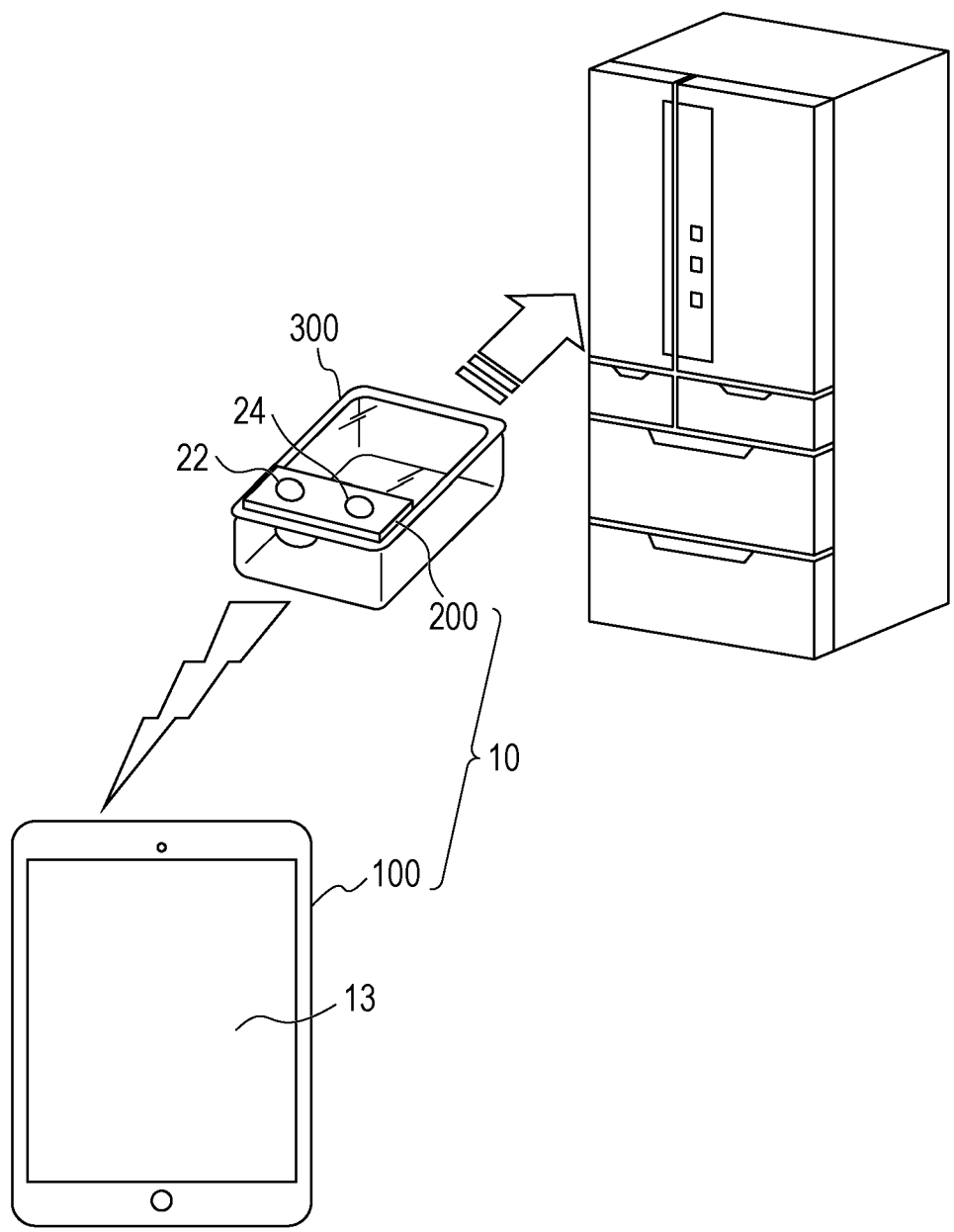
FIG. 1 is an external view of an information system in a first embodiment.

Underlying Knowledge Forming Basis of the Present Disclosure

A person who performs cooking on a daily basis (referred to below as the first cook, who is, for example, the wife) may not able to cook because the first cook cannot go home. When this happens, another family member (referred to below as the second cook, who is, for example, the husband) may cook by using intermediate foodstuffs that was already made in pre-preparation. This involves problems described below.

(i) The second cook does not know which intermediate foodstuffs to use.

(ii) The second cook does not know what meal should be made and how to cook it.

(iii) The second cook does not know where seasonings are stored.

In the conventional solution to the problem in (i) above, the first cook writes a date or a day of the week on which to cook, the name of a finished article (a meal), the name of an intermediate foodstuff, and other information on a label and then attaches the label to a label to a food container in which an intermediate foodstuff made in pre-preparation is stored. However, this manual labeling takes time and imposes a large load on the first cook.

In view of the above, the present inventor studied the following remedial measures.

(1) An information processing method according to one aspect of the present disclosure causes a processor in an information terminal to: display, on a display of the information terminal, a first display screen representing a pre-preparation process included in a plurality of cooking processes, the first display screen displaying foodstuff information indicating an intermediate foodstuff made through the pre-preparation process; acquire first identification information indicating a food container in which the intermediate foodstuff is stored from an electronic tag apparatus attached to the food container while the first display screen is displayed on the display; store, in a memory, (i) foodstuff information and the first identification information or (ii) process information and the first identification information, the foodstuff information or the process information being associated with the first identification information in the memory, the foodstuff information indicating the intermediate foodstuff, and the process information indicating the pre-preparation process; display, on the display, a second display screen representing a finish process included in the plurality of cooking processes, the intermediate foodstuff being prepared in the finish process; and when the second display screen is displayed, transmit a command to the electronic tag apparatus according to the first identification information, the command causing the electronic tag apparatus to perform an operation for allowing a user to discriminate the food container.

(2) In the above aspect, the command may cause a light source provided in the electronic tag apparatus to emit light.

(3) In the above aspect, after causing the processor to display the first display screen, the information processing method may further cause the processor to read out, from the memory, second identification information indicating an electronic tag apparatus attached to a food container indicated by identification information that is not associated with intermediate foodstuff information or process information and to transmit the command to the electronic tag apparatus according to the second identification information. The second identification information may include the first identification information.

(4) In the above aspect, after causing the processor to transmit the command to the electronic tag apparatus according to the second identification information, the information processing method may further cause the processor to display, on the display, notification information that prompts the user to store the intermediate foodstuff in the food container.

(5) In the above aspect, the electronic tag apparatus may have an open/closed sensor that detects the open or closed state of the cover of the food container. When the sensor detects that the cover of the food container has been closed, the first identification information may be acquired from the electronic tag apparatus.

(6) In the above aspect, the electronic tag apparatus may have an illumination sensor. When illumination measured by the illumination sensor becomes equal to or higher than a predetermined threshold, the first identification information may be acquired from the electronic tag apparatus.

(7) In the above aspect, a transition from the first display screen to a next screen on the display may be stopped until the (i) foodstuff information and the first identification information or (ii) the process information and the first identification information are stored in the memory.

(8) An information processing method according to another aspect of the present disclosure causes a processor in an information terminal to: display, on a display of the information terminal, a first display screen representing a pre-preparation process included in a plurality of cooking processes, the first display screen displaying foodstuff information indicating an intermediate foodstuff made through the pre-preparation process; transmit, to an electronic tag apparatus attached to a food container, foodstuff information indicating the intermediate foodstuff or process information indicating the pre-preparation process; acquire, from the electronic tag apparatus, information indicating that the intermediate foodstuff has been stored in the food container, and store the foodstuff information or process information in the electronic tag apparatus; display, on the display of the information terminal, a second display screen representing a finish process included in the plurality of cooking processes, the intermediate foodstuff being prepared in the finish process; and transmit the foodstuff information or process information to the electronic tag apparatus, an operation being executed in the electronic tag apparatus according to the foodstuff information or process information, the operation allowing a user to discriminate the food container in which the intermediate foodstuff is stored.

Embodiments of the above information processing method will be specifically described below with reference to the drawings.

All embodiments described below illustrate comprehensive or specific examples. Numerals, shapes, materials, constituent elements, the placement positions and connection forms of these constituent elements, steps, the sequence of these steps, and the like are just examples, and are not intended to restrict the scope of claims. Of the constituent elements described in the embodiments below, constituent elements not described in independent claims, each of which indicates the topmost concept, will be described as optional constituent elements.

Each drawing is a schematic drawing and is not necessarily drawn in a rigorous manner. In all drawings, like constituent members area denoted by like reference characters. In the embodiments described below, the expression "substantially the same" or the like will be used in some places. The expression "substantially the same" not only means "exactly the same" but also means "essentially the same" that is, means that an error of several percent is included.

First Embodiment

Structure of an Information System

First, the structure of an information system 10 in a first embodiment will be described. FIG. 1 is an external view of the information system 10 in the first embodiment.

The information system 10 has an information terminal apparatus 100 and an electronic tag apparatus 200.

The information terminal apparatus 100 is, for example, a smartphone, a tablet computer, a note personal computer (PC). The information terminal apparatus 100 sequentially displays, on a display 13, a plurality of slides representing a plurality of tasks required in pre-preparation for cooking and in finishing.

The display 13 is, for example, a liquid crystal display (LCD) or an organic electroluminescent (EL) display (organic light emitting diode (OLED)). The display 13 may be a touch screen. By performing tasks represented by slides, the user can make and store intermediate foodstuffs and can use the stored intermediate foodstuffs to complete cooking.

A food container 300 is a covered food container in which intermediate foodstuffs are stored. However, the food container 300 may be an uncovered food container, a bag, or a disk. An electronic tag 200 is attached to the food container 300.

The electronic tag apparatus 200, which is connected to the information terminal apparatus 100 through a communication network, has identification information (second identification information) that identifies the electronic tag apparatus 200. The electronic tag apparatus 200 communicates with the information terminal apparatus 100 in compliance with, for example, a short-range wireless communication standard (such as, for example, Bluetooth (registered trademark), an infrared communication standard, ZigBee (registered trademark), a wireless local area network (LAN) standard, or ISO/IEC 18000-1 (radio frequency identifier (RFID) communication method)). Alternatively, to establish communication between the electronic tag apparatus 200 and the information terminal apparatus 100, near field communication (NFC) may be performed.

As illustrated in FIG. 1, the electronic tag apparatus 200 has a light source 22, which emits visible light, and a button 24. The light source 22 is, for example, a light emitting diode (LED). Upon the receipt of light emitting command information from the information terminal apparatus 100, the light source 22 emits light. The button 24 is a mechanical part operated by the user. When the button 24 is operated, the electronic tag apparatus 200 transmits its identification information to the information terminal apparatus 100.

Figure 2:
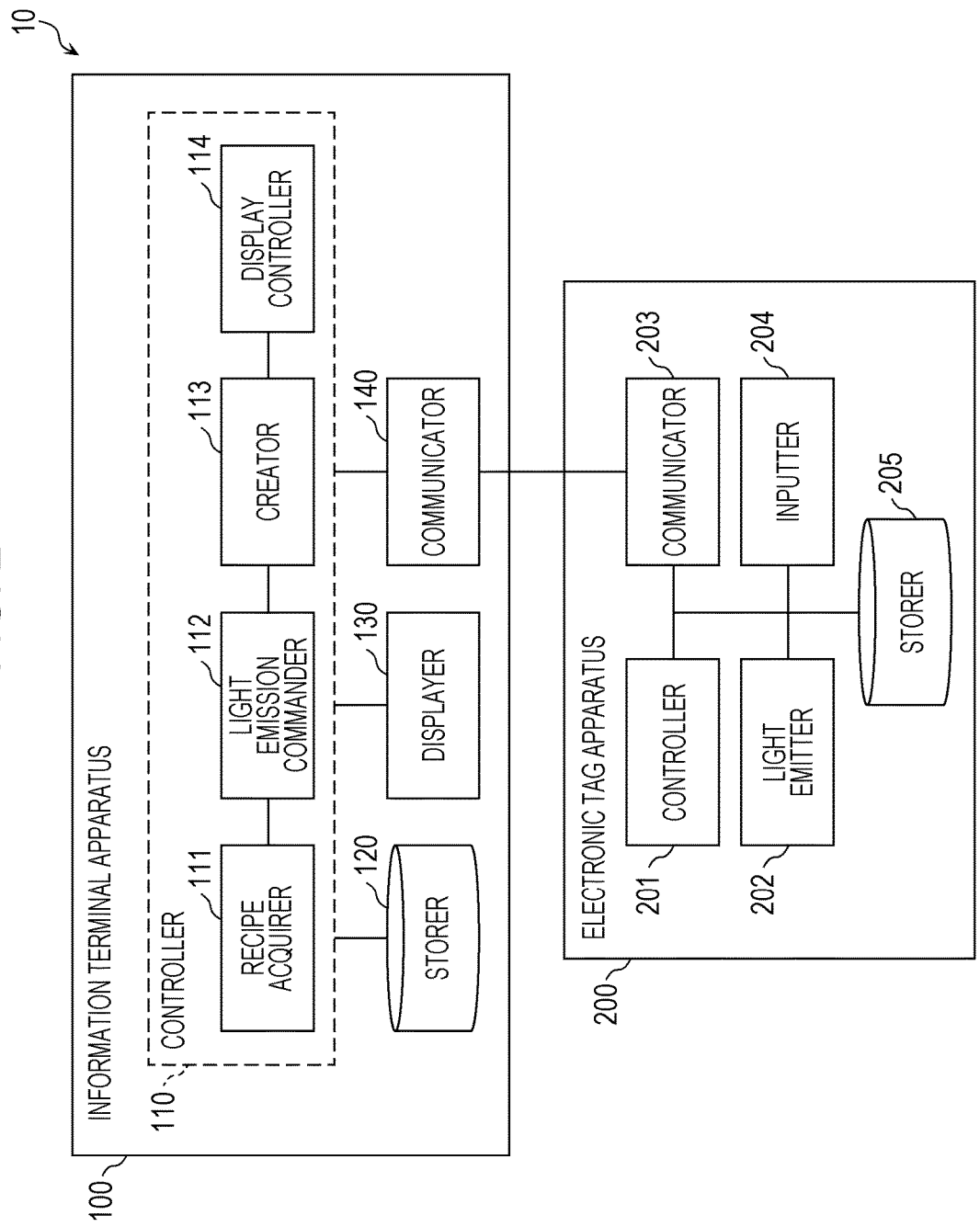
FIG. 2 is a block diagram of the functional structure of the information system in the first embodiment.

Next, the functional structures of the information terminal apparatus 100 and electronic tag apparatus 200 that implement the information system 10 will be described with reference to FIG. 2. These functional structures implement the information system 10. FIG. 2 is a block diagram of the functional structure of the information system 10 in the first embodiment.

Functional Structure of the Information Terminal Apparatus

The information terminal apparatus 100 has a controller 110, a storer 120, a displayer 130, and a communicator 140.

The controller 110 is implemented by, for example, a processor and a memory. When instructions or software program stored in the memory is executed, the processor functions as the controller 110. Alternatively, the controller 110 may be implemented by a special electronic circuit. The special electronic circuit may be an integrated circuit.

As illustrated in FIG. 2, the controller 110 has a recipe acquirer 111, a light emission commander 112, a creator 113, and a display controller 114.

The recipe acquirer 111 acquires first cooking recipe information and second cooking recipe information from, for example, a cloud server (not illustrated) through the Internet. Alternatively, the recipe acquirer 111 may acquire the first cooking recipe information and second cooking recipe information from, for example, the storer 120.

The first cooking recipe information includes first cooking process information representing a plurality of first tasks performed for pre-preparation for cooking, and also includes first foodstuff information representing foodstuffs used in pre-preparation for cooking. The second cooking recipe information includes second cooking process information representing a plurality of second tasks performed to finish cooking, and also includes second foodstuff information representing foodstuffs and intermediate foodstuffs that are used to finish cooking.

Pre-preparation is a process to make intermediate foodstuffs from foodstuffs and store them. For example, preparation for a salad includes a task to slice a cucumber into rounds, place sliced cucumber chips in the food container 300, and store the food container 300 in a refrigerator.

Finishing is a process to complete cooking by using foodstuffs and the intermediate foodstuffs made in pre-preparation. For example, the finishing of a salad includes a task to take the food container 300 in which sliced cucumber chips are stored out of the refrigerator and place the food container 300 at a certain position suitable for cooking, and also includes a task to complete the salad by using sliced cucumber chips.

The light emission commander 112 commands the electronic tag apparatus 200 to emit light. When, for example, information about a first task involving the storage of an intermediate foodstuff is displayed on the displayer 130, the light emission commander 112 transmits, to the electronic tag apparatus 200 through the communicator 140, first command information indicating a command that causes a light emitter 202 in the electronic tag apparatus 200 to emit light. In another example, when information about a second task involving preparation for an intermediate foodstuff is displayed on the displayer 130, the light emission commander 112 transmits second command information indicating a command that causes the light emitter 202 to emit light, according to correspondence information, through the communicator 140 to the electronic tag apparatus 200 having the identification information corresponding to the intermediate foodstuff. The first command information and second command information may be a message that just commands the emission of light or may include information indicating a color of emitted light and an light emitting pattern (such as, for example, blinking pattern). A color of emitted light and a light emitting pattern may be specified by the user or may be predetermined in correspondence to an intermediate foodstuff or a process.

If the identification information of the electronic tag apparatus 200 is received while information about a first task involving the storage of an intermediate foodstuff is displayed on the displayer 130, the creator 113 creates correspondence information that associates the received identification information and information about the intermediate foodstuff corresponding to the first task with each other.

The display controller 114 displays, on the displayer 130, a plurality of first slides representing a plurality of first tasks performed for pre-preparation for cooking, the first tasks being displayed in their ascending order, according to the first cooking recipe information acquired by the recipe acquirer 111. Each of the plurality of first slides, which is an example of information about a first task, is image data including a character string indicating the contents of the first task, an image concerning the first task, a symbol that identifies cooking, and the like.

The display controller 114 further displays, on the displayer 130, a plurality of second slides representing a plurality of second tasks performed to finish cooking, the second slides being displayed in their ascending order, according to the second cooking recipe information acquired by the recipe acquirer 111. Each of the plurality of second slides, which is an example of information about a second task, is image data including a character string indicating the contents of the second task, an image concerning the second task, a symbol that identifies cooking, and the like.

The storer 120 is, for example, a semiconductor memory, a hard disk drive, or another storage device. The storer 120 stores correspondence information created by the creator 113. The storer 120 may also store the first cooking recipe information and second cooking recipe information.

FIG. 3 illustrates an example of correspondence information in the first embodiment. A correspondence table 120a is an example of correspondence information. It associates the identification information of the electronic tag apparatus 200 and intermediate foodstuff information in one-to-one correspondence with each other. For example, an electronic tag apparatus identified by 001 and an intermediate foodstuff identified by A-01 are associated with each other. No intermediate foodstuff is associated with an electronic tag apparatus identified by 004.

The displayer 130 is implemented by a display 13.

The communicator 140 is implemented by, for example, a short-range wireless communication adapter. The communicator 140 receives identification information from the electronic tag apparatus 200. In addition, the communicator 140 transmits command information to the electronic tag apparatus 200.

Functional Structure of the Electronic Tag Apparatus

The electronic tag apparatus 200 has a controller 201, the light emitter 202, a communicator 203, an inputter 204, and a storer 205.

The controller 201 is implemented by, for example, a special electronic circuit. Alternatively, the controller 201 may be implemented by a processor and a memory. When instructions or software program stored in the memory is executed, the processor functions as the controller 201.

When the inputter 204 is operated, the controller 201 reads out identification information from the storer 205 and transmits the read-out identification information to the information terminal apparatus 100 through the communicator 203. When the inputter 204 is operated, the controller 201 may stop the light emitter 202 from emitting light. When the communicator 203 receives command information from the information terminal apparatus 100, the controller 201 causes the light emitter 202 to emit light.

The light emitter 202 is implemented by the light source 22. The light emitter 202 emits visible light.

The communicator 203 is implemented by, for example, a short-range wireless communication adapter. The communicator 203 transmits identification information to the information terminal apparatus 100. In addition, the communicator 203 receives command information from the information terminal apparatus 100.

The inputter 204 is implemented by the button 24. When the button 24 is operated, the inputter 204 transmits a signal to the controller 201.

The storer 205 stores identification information by which one electronic tag apparatus 200 can be identified. The storer 205 is implemented by, for example, a semiconductor memory. Identification information is, for example, an identifier uniquely determined by the electronic tag apparatus 200. Alternatively, identification information may be, for example, an identifier assigned by the information terminal apparatus 100 or the like. An identifier uniquely determined in advance may be a physical address (such as a Bluetooth device (BD) address or media access control (MAC) address) used for communication.

Operation of the Information System

Next, processing by the information system 10 structured as described above will be described.

Pre-Preparation for Cooking

First, processing executed by the information terminal apparatus 100 in pre-preparation for cooking will be described with reference to FIGS. 4 to 7.

Figure 4:
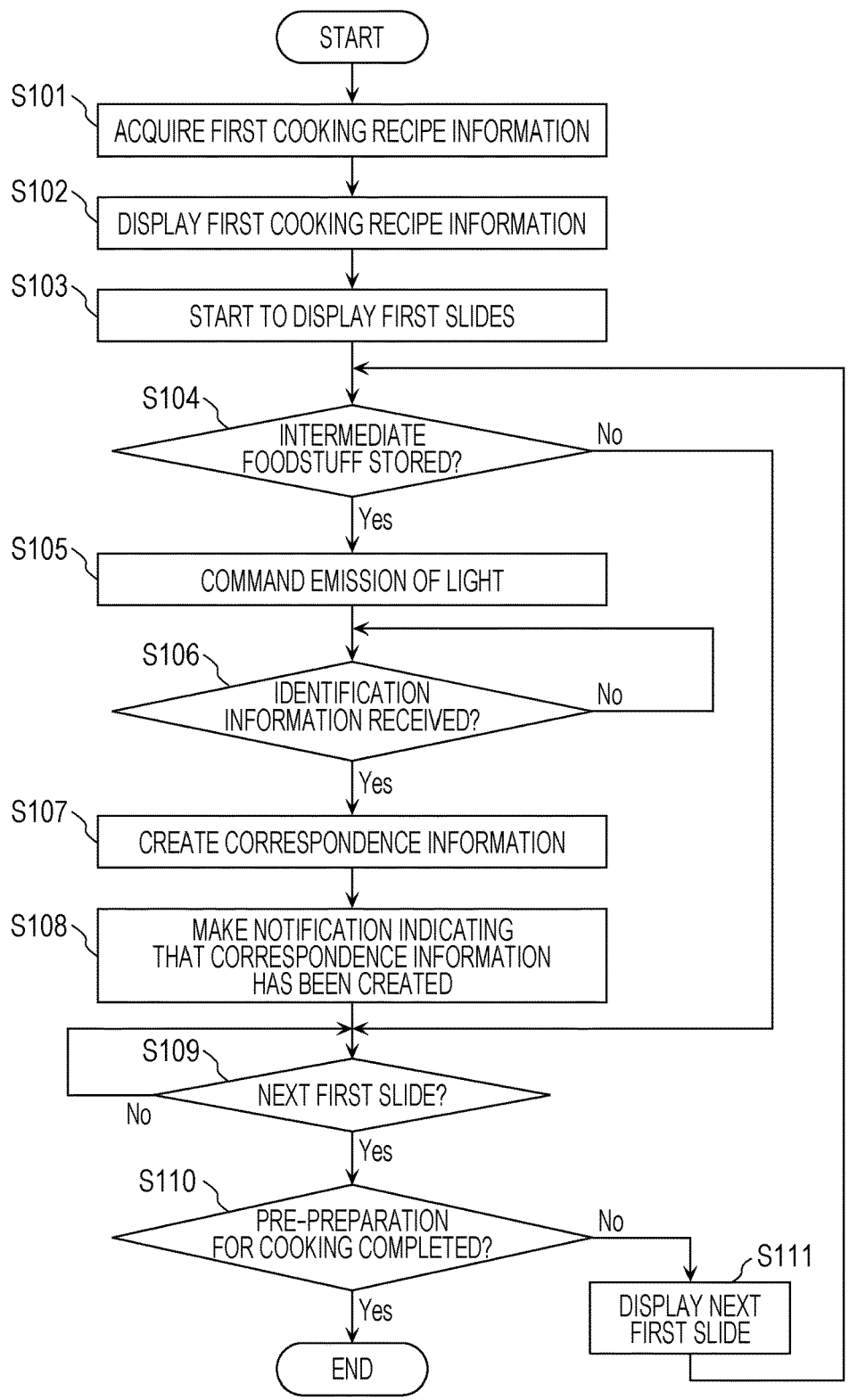
FIG. 4 is a flowchart illustrating processing executed by an information terminal apparatus in the first embodiment in pre-preparation for cooking.
Figure 5:
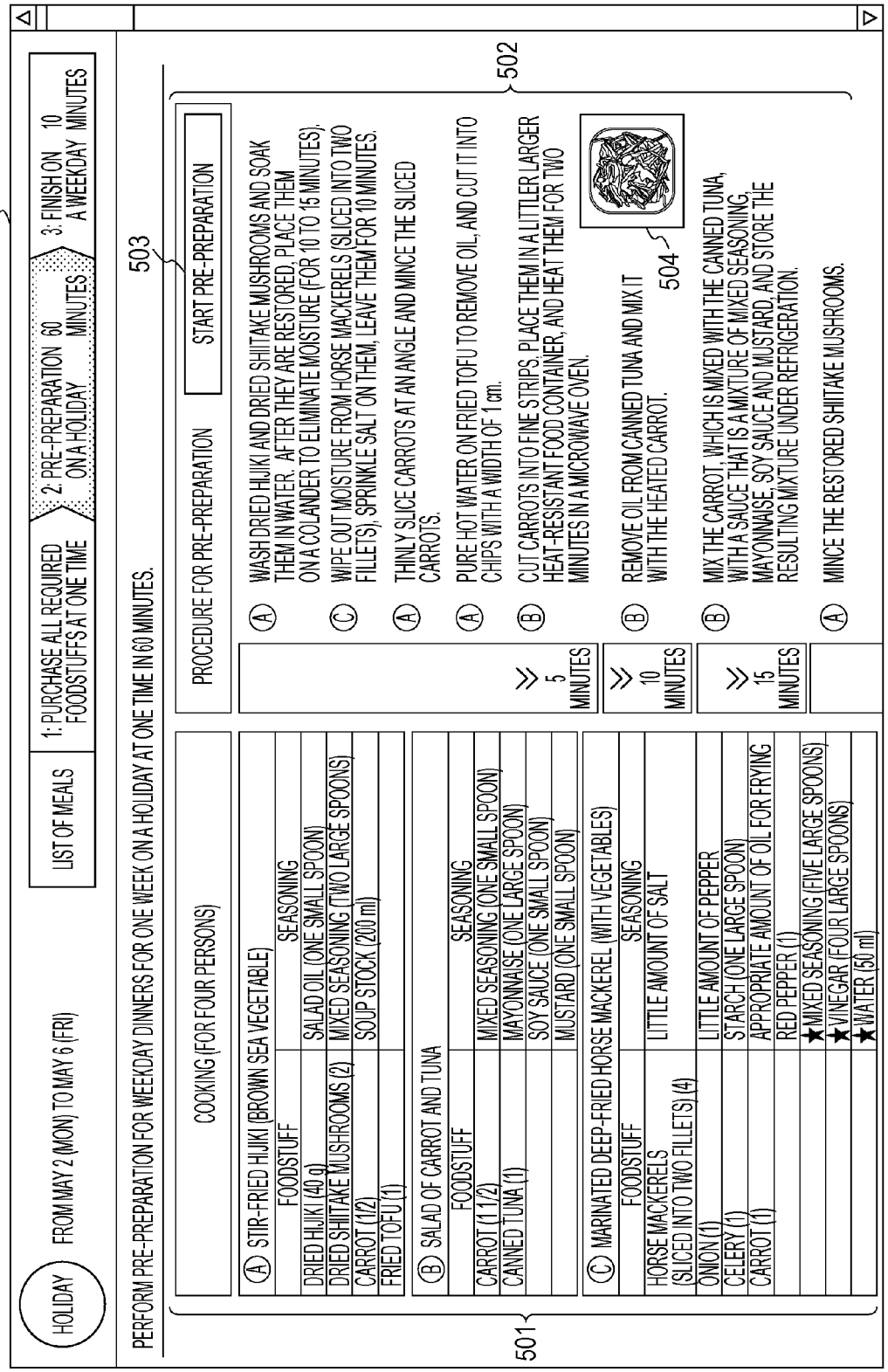
FIG. 5 illustrates an example of a display of first cooking recipe information in the first embodiment.
Figure 6:
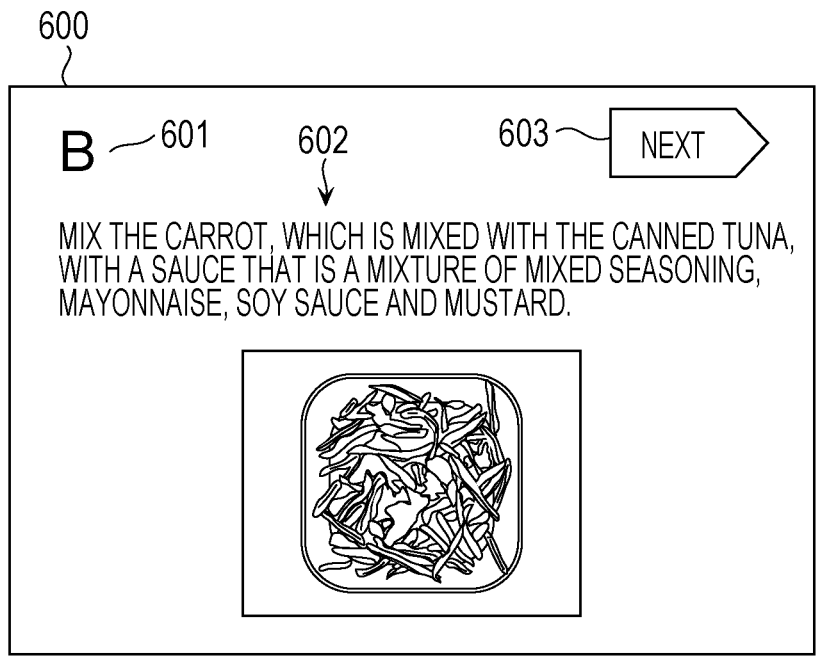
FIG. 6 illustrates an example of a first slide displayed in pre-preparation for cooking in the first embodiment.
Figure 7:
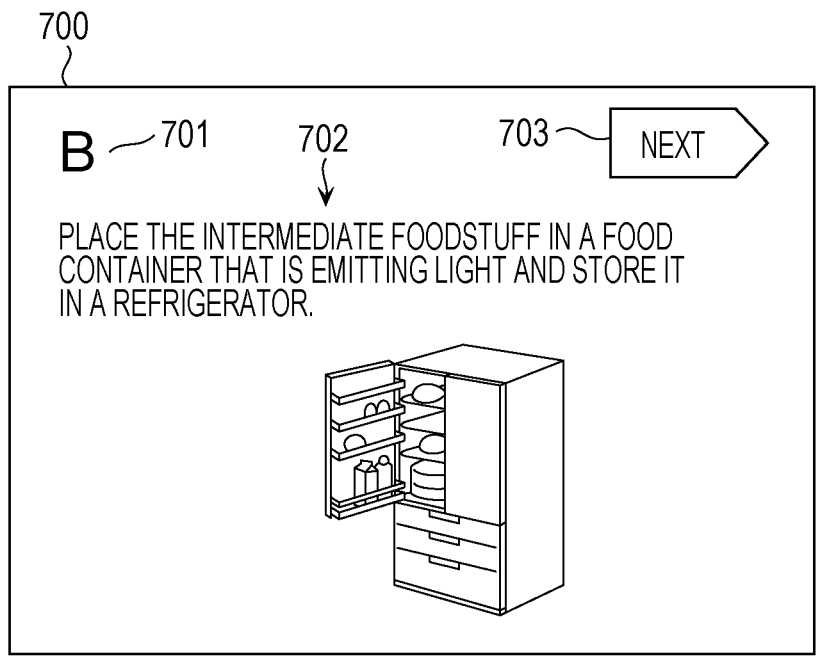
FIG. 7 illustrates an example of another first slide displayed in pre-preparation for cooking in the first embodiment.

FIG. 4 is a flowchart illustrating processing executed by the information terminal apparatus 100 in the first embodiment in pre-preparation for cooking. FIG. 5 illustrates an example of a display of first cooking recipe information in the first embodiment. FIGS. 6 and 7 each illustrate an example of a first slide displayed in pre-preparation for cooking in the first embodiment. In a first slide 600 in FIG. 6, a symbol 601 indicates an identifier of cooking (completed meal), a text 602 is a character string indicating the contents of a first task, and a button 603 is a graphical user interface (GUI) through which an operation to proceed to a next first slide is accepted from the user. Similarly, in a first slide 700 in FIG. 7, a symbol 701 indicates an identifier of cooking (completed meal), a text 702 is a character string indicating the contents of a first task, and a button 703 is a graphical user interface (GUI) through which an operation to proceed to a next first slide is accepted from the user. The first slide 600 represents a task to prepare a foodstuff to make a meal B. The first slide 700 represents a task to store an intermediate foodstuff used for the meal B.

The recipe acquirer 111 acquires first cooking recipe information (S101). Then, the display controller 114 displays the first cooking recipe information on the displayer 130 (S102). First cooking recipe information 500 is displayed, for example, as illustrated in FIG. 5. The first cooking recipe information 500 includes first foodstuff information 501 indicating foodstuffs and seasonings that are required for pre-preparation for cooking, and also includes first cooking process information 502 indicating a plurality of first tasks performed for pre-preparation for cooking.

To start to display a plurality of first slides representing a plurality of first tasks performed for pre-preparation for cooking, the user presses a button 503 (see FIG. 5) displayed on the displayer 130. This causes the display controller 114 to start to display the plurality of first slides representing the plurality of first tasks (S103). Specifically, the display controller 114 displays the first one out of the plurality of first slides. For example, the display controller 114 displays the first slide 600 illustrated in FIG. 6.

The light emission commander 112 decides whether the first slide displayed on the displayer 130 is a storage slide (S104). The storage slide is a slide representing a first task involving the storage of an intermediate foodstuff. The first task involving the storage of an intermediate foodstuff is a task to store an intermediate foodstuff. The first task involving the storage of an intermediate foodstuff may include a task to make an intermediate foodstuff. In the decision as to whether the first slide is a storage slide, the light emission commander 112 may reference, for example, attribute information that has been set in advance for each of the plurality of first slides.

If, for example, the first slide 700 in FIG. 7 is displayed, the light emission commander 112 decides that the displayed first slide is a storage slide. By contrast, if the first slide 600 in FIG. 6 is displayed, the light emission commander 112 decides that the displayed first slide is not a storage slide.

If the displayed first slide is a storage slide (the result in S104 is Yes), the light emission commander 112 creates first command information and transmits the created first command information to the electronic tag apparatus 200 through the communicator 140 (S105). Specifically, the light emission commander 112 selects identification information (00 or 005, or example) with which intermediate foodstuff information is not yet associated with reference to, for example, the correspondence table 120a illustrated in FIG. 3, and transmits the first command information to the electronic tag apparatus 200 having the selected identification information.

After that, the creator 113 decides whether the communicator 140 has received the identification information of the electronic tag apparatus 200 (S106). If, for example, the user places an intermediate foodstuff in the food container 300 and then operates the inputter 204 of the electronic tag apparatus 200 attached to the food container 300, identification information is transmitted from the electronic tag apparatus 200 to the information terminal apparatus 100. Therefore, when the communicator 140 receives identification information from the electronic tag apparatus 200, the reception indicates that an intermediate foodstuff has been placed in the food container 300.

If the communicator 140 has not received identification information (the result n S106 is No), step S106 is repeated. That is, if a storage slide is displayed on the displayer 130, the display of a next first slide is prohibited until the identification information of the electronic tag apparatus 200 is received.

If the communicator 140 has received identification information (the result in S106 is Yes), the creator 113 creates correspondence information that associates the received information and information about the intermediate foodstuff stored in the first task represented by the displayed first slide with each other (S107). For example, the creator 113 creates correspondence information by entering information about the intermediate foodstuff in a record, in the correspondence table 120a illustrated in FIG. 3, for the received identification information.

The information terminal apparatus 100 makes a notification indicating that correspondence information has been created (S108). For example, the light emission commander 112 transmits, to the electronic tag apparatus 200 through the communicator 140, command information that commands the emission of light to make a notification indicating that correspondence information has been created. In response to the received command information, the electronic tag apparatus 200 causes the light emitter 202 to emit light to notify the user that the food container 300 including an intermediate foodstuff and the first task have been associated with each other. Alternatively, for example, the display controller 114 may display, on the displayer 130, notification information indicating that correspondence information has been created.

If the displayed first slide is a not storage slide (the result in S104 is No) or after correspondence information has been created in step S107, the display controller 114 decides whether to display a next first slide (S109). For example, the display controller 114 decides whether the button 603 in FIG. 6 or the button 703 in FIG. 7 has been pressed.

If the display controller 114 decides not to display a next first slide (the result in S109 is No), step S109 is repeated. If the display controller 114 decides to display a next first slide (the result in S109 is Yes), the display controller 114 decides whether pre-preparation for cooking has been completed (S110). Specifically, the display controller 114 decides whether the currently displayed first slide is the last one of the plurality of first slides. If pre-preparation for cooking has not been completed (the result in S110 is No), the display controller 114 displays a next first slide (S111) and returns to step S104. If pre-preparation for cooking has been completed (the result in S110 is Yes), the display controller 114 terminates the processing.

Finish in Cooking

Next, processing executed by the information terminal apparatus 100 in the finish of cooking will be described with reference to FIGS. 8 to 11.

Figure 8:
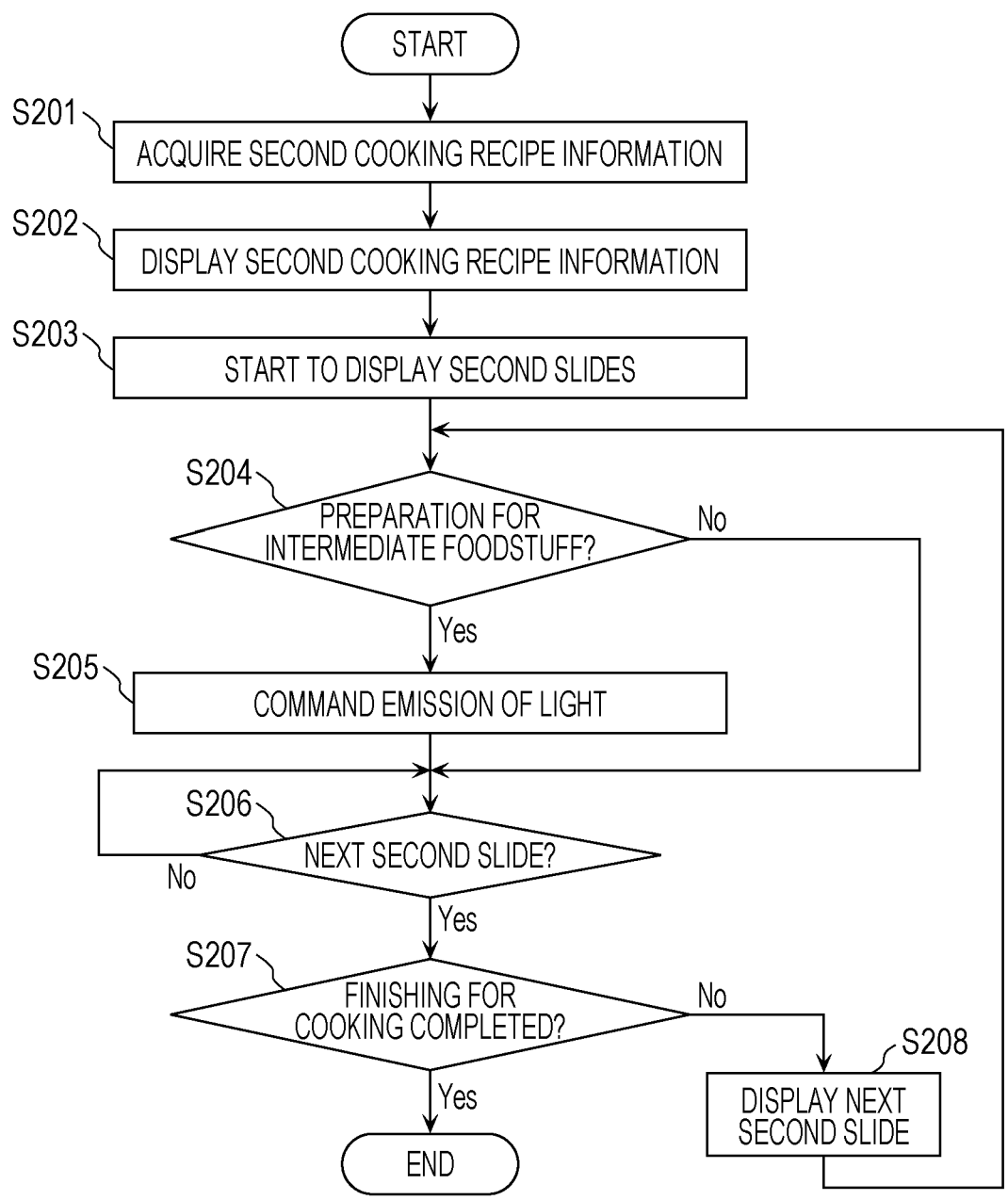
FIG. 8 is a flowchart illustrating processing executed by the information terminal apparatus in the first embodiment in the finish of cooking.
Figure 9:
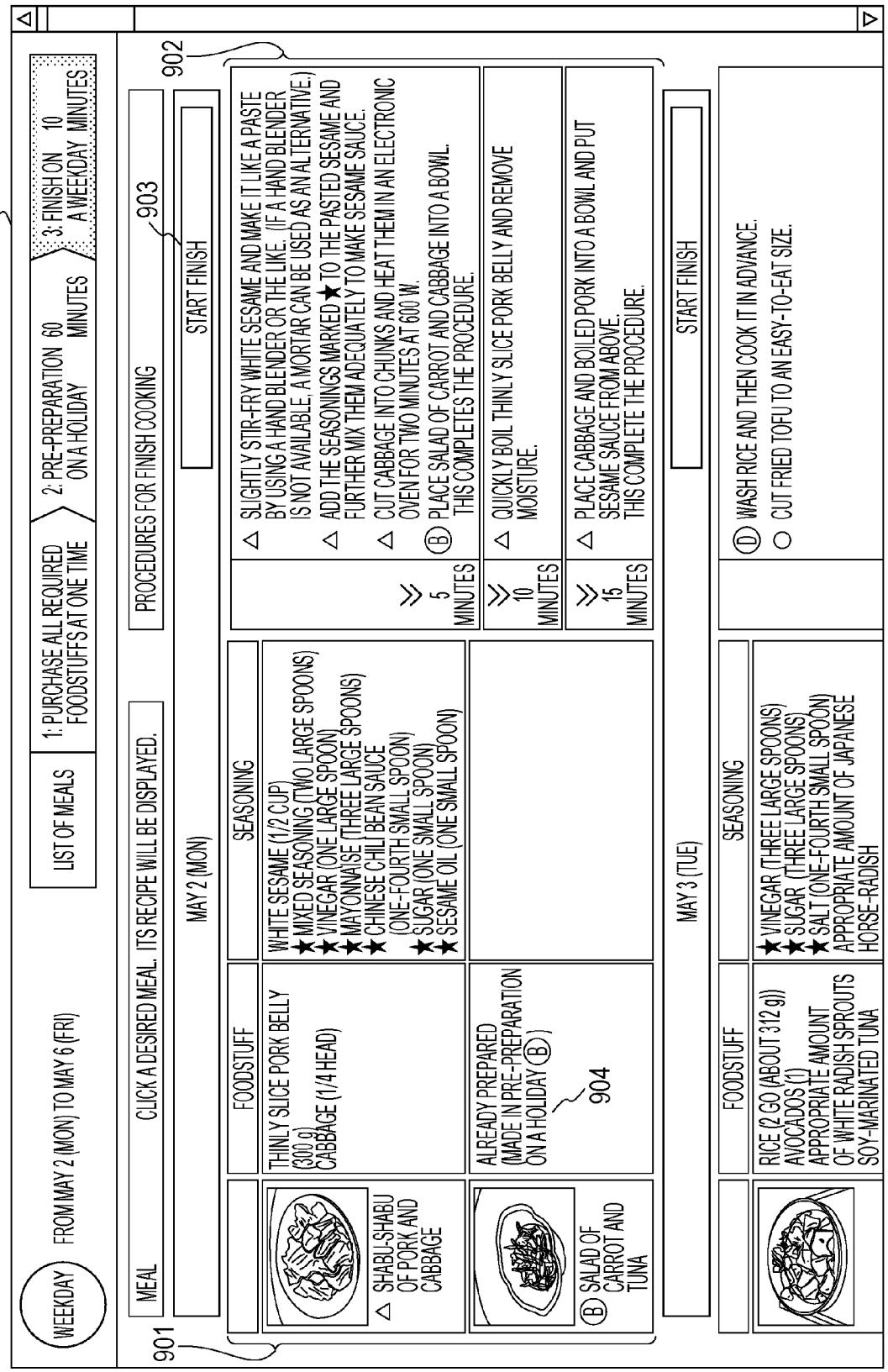
FIG. 9 illustrates an example of a display of second cooking recipe information in the first embodiment.
Figure 10:
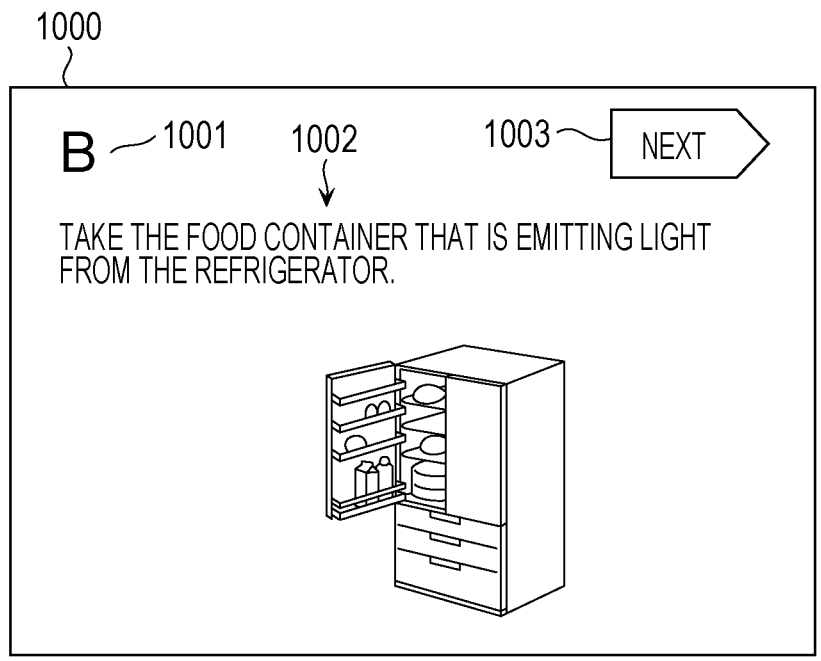
FIG. 10 illustrates an example of a second slide displayed in the finish of cooking in the first embodiment.
Figure 11:
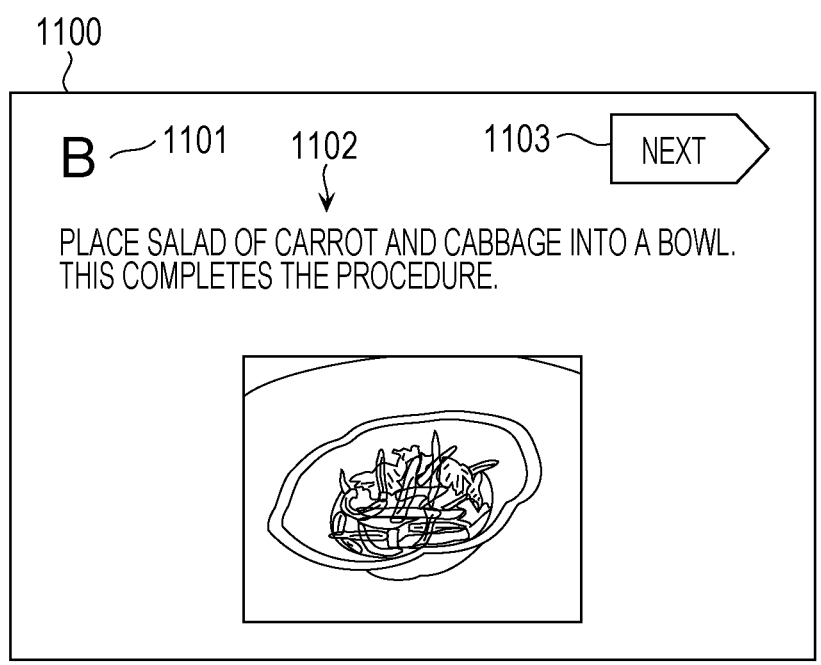
FIG. 11 illustrates an example of another second slide displayed in the finish of cooking in the first embodiment.

FIG. 8 is a flowchart illustrating processing executed by the information terminal apparatus 100 in the first embodiment in the finish of cooking. FIG. 9 illustrates an example of a display of second cooking recipe information 900 in the first embodiment. FIGS. 10 and 11 each illustrate an example of a second slide displayed in the finish of cooking in the first embodiment. Each second slide is an example of a second task. In a second slide 1000 in FIG. 10, a symbol 1001 indicates an identifier of cooking (completed meal), a text 1002 is a character string indicating the contents of a second task, and a button 1003 is a GUI through which an operation to proceed to a next second slide is accepted from the user. Similarly, in a second slide 1100 in FIG. 11, a symbol 1101 indicates an identifier of cooking (completed meal), a text 1102 is a character string indicating the contents of a second task, and a button 1103 is a GUI through which an operation to proceed to a next second slide is accepted from the user. The second slide 1000 represents a task to dispose the food container 300 including an intermediate foodstuff used to make the meal B at a predetermined position. The second slide 1100 represents a task to complete cooking by using the intermediate foodstuff.

The recipe acquirer 111 acquires second cooking recipe information (S201). Then, the display controller 114 displays the second cooking recipe information on the displayer 130 (S202). Second cooking recipe information 900 is displayed, for example, as illustrated in FIG. 9. The second cooking recipe information 900 includes second foodstuff information 901 indicating foodstuffs, intermediate foodstuffs, and seasonings that are required to finish cooking, and also includes second cooking process information 902 indicating a plurality of second tasks performed to finish cooking.

To start to display a plurality of second slides representing a plurality of second tasks performed to finish cooking, the user presses a button 903 (see FIG. 9) displayed on the displayer 130. This causes the display controller 114 to start to display the plurality of second slides representing the plurality of second tasks (S203). Specifically, the display controller 114 displays the first one of the plurality of second slides. For example, the display controller 114 displays the second slide 1000 illustrated in FIG. 10.

The light emission commander 112 decides whether the second slide displayed on the displayer 130 is a preparation slide (S204). The preparation slide is a second slide representing a second task involving preparation for an intermediate foodstuff. The second task involving preparation for an intermediate foodstuff is a task to take a food container 300 including an intermediate foodstuff out of a storage box (a refrigerator, for example) and makes the intermediate foodstuff ready for cooking. The second task involving preparation for an intermediate foodstuff may include a task to perform cooking by using the intermediate foodstuff. In the decision as to whether the second slide is a preparation slide, the light emission commander 112 may reference, for example, attribute information that has been set in advance for each of the plurality of second slides.

If, for example, the second slide 1000 in FIG. 10 is displayed, the light emission commander 112 decides that the displayed second slide is a preparation slide.

If the displayed second slide is a preparation slide (the result in S204 is Yes), the light emission commander 112 creates second command information and transmits the created second command information to the electronic tag apparatus 200 through the communicator 140 (S205). Specifically, the light emission commander 112 identifies identification information corresponding to the intermediate foodstuff displayed on the reference slide with reference to, for example, the correspondence table 120a illustrated in FIG. 3, and transmits the second command information to the electronic tag apparatus 200 having the identified identification information.

Thus, the user can easily find the food container 300 to which the electronic tag apparatus 200 that is emitting light is attached. Therefore, when the user takes out the intermediate foodstuff used to finish cooking, it is possible to suppress the user from taking out a wrong intermediate foodstuff mistakenly.

If the displayed second slide is a not preparation slide (the result in S204 is No) or after a light emitting command has been transmitted in step S205, the display controller 114 decides whether to display a next second slide (S206). For example, the display controller 114 decides whether the button 1003 in FIG. 10 or the button 1103 in FIG. 11 has been pressed.

If the display controller 114 decides not to display a next second slide (the result in S206 is No), step S206 is repeated.

If the display controller 114 decides to display a next second slide (the result in S206 is Yes), the display controller 114 decides whether finishing for cooking has been completed (S207). Specifically, the display controller 114 decides whether the currently displayed second slide is the last one of the plurality of second slides.

If finishing for cooking has not been completed (the result in S207 is No), the display controller 114 displays a next second slide (the second slide 1100 in FIG. 11, for example) (S208) and returns to step S204. If finishing for cooking has been completed (the result in S207 is Yes), the display controller 114 terminates the processing.

Effects

As described above, the information system 10 in this embodiment has the electronic tag apparatus 200 and the information terminal apparatus 100 connected to the electronic tag apparatus 200 through a network. The electronic tag apparatus 200 has the storer 205 that stores identification information by which the electronic tag apparatus 200 can be identified, the communicator 203 that communicates with the information terminal apparatus 100 through the network, and the controller 201 that transmits the identification information to the information terminal apparatus 100 through the communicator 203. The information terminal apparatus 100 has the displayer 130, the communicator 140 that communicates with the electronic tag apparatus 200 through the network, the recipe acquirer 111 that acquires first cooking recipe information that includes first cooking process information representing a plurality of first tasks performed for pre-preparation for cooking and also includes first foodstuff information representing foodstuffs used in pre-preparation for cooking, the display controller 114 that sequentially displays information about a plurality of first tasks on the displayer 130 according to the first cooking recipe information, and the creator 113 that, if the communicator 140 receives the identification information of the electronic tag apparatus 200 while information about a first task involving the storage of an intermediate foodstuff made in pre-preparation for cooking is displayed on the displayer 130, creates correspondence information that associates the received identification information and information about the intermediate foodstuff to be stored in the first task with each other.

In this structure, if the communicator 140 receives the identification information of the electronic tag apparatus 200 while information about a first task involving the storage of an intermediate foodstuff is displayed on the displayer 130, the creator 113 in the information terminal apparatus 100 can associate the received identification information and information about the intermediate foodstuff to be stored in the first task with each other. Therefore, when a plurality of first tasks, which are sequentially displayed on the displayer 130, are performed, the intermediate foodstuff made in pre-preparation for cooking can be easily associated with the electronic tag apparatus 200 during the pre-preparation. This enables the intermediate foodstuff to be easily managed.

In the information system 10 in this embodiment, the electronic tag apparatus 200 also has the inputter 204. When the inputter 204 is operated, the controller 201 in the electronic tag apparatus 200 transmits identification information to the information terminal apparatus 100 through the communicator 203.

In this structure, when storing an intermediate foodstuff, the user can easily associate the intermediate foodstuff and the electronic tag apparatus 200 just by operating the inputter 204 of the electronic tag apparatus 200.

In the information system 10 in this embodiment, the electronic tag apparatus 200 further has the light emitter 202 that emits visible light, and the information terminal apparatus 100 further has the light emission commander 112 that transmits, when information about a first task involving the storage of an intermediate foodstuff is displayed on the displayer 130, to the electronic tag apparatus 200 through the communicator 140, first command information indicating a command that causes the light emitter 202 to emit light.

In this structure, an intermediate foodstuff can be stored by using the electronic tag apparatus 200 that is emitting light. Therefore, the user can easily find the electronic tag apparatus 200 to be used to store an intermediate foodstuff.

In the information system 10 in this embodiment, the correspondence table 120a associates information about a plurality of intermediate foodstuffs and the identification information of a plurality of electronic tag apparatuses 200 with each other; the recipe acquirer 111 further acquires second cooking recipe information that includes second cooking process information representing a plurality of second tasks performed to finish cooking and second foodstuff information representing foodstuffs and intermediate foodstuffs that are used to finish cooking; the display controller 114 further sequentially displays information about a plurality of second tasks on the displayer 130; when information about a second task involving preparation for an intermediate foodstuff is displayed on the displayer 130, the light emission commander 112 references the correspondence table 120a and further transmits, to the electronic tag apparatus 200 having the identification information corresponding to the intermediate foodstuff through the communicator 140, second command information indicating a command that causes the light emitter 202 to emit light.

In this structure, when preparing an intermediate foodstuff used to finish cooking, it is possible to cause the electronic tag apparatus 200 corresponding to the intermediate foodstuff to emit light. This enables the user to easily make a preparation for an intermediate foodstuff required to finish cooking.

In the information system 10 in this embodiment, while information about a first task involving the storage of an intermediate foodstuff made in pre-preparation for cooking is displayed on the displayer 130, the display controller 114 prohibits the display of information about a next first task until the identification information of the electronic tag apparatus 200 is received.

In this structure, information about a next first task is not displayed until identification information is received. This prevents the user from proceeding to a next task until the intermediate foodstuff is correctly stored. As a result, it is possible to more accurately associate an intermediate foodstuff and the electronic tag apparatus 200 with each other.

Second Embodiment

Next, a second embodiment will be described. The second embodiment differs from the first embodiment in that, in the finish of cooking, the heating of an intermediate foodstuff in a microwave oven is prohibited if an electronic tag apparatus is attached to a food container in which the intermediate foodstuff is stored. The second embodiment will be described below, focusing on differences from the first embodiment above.

Structure of an Information System

Figure 12:
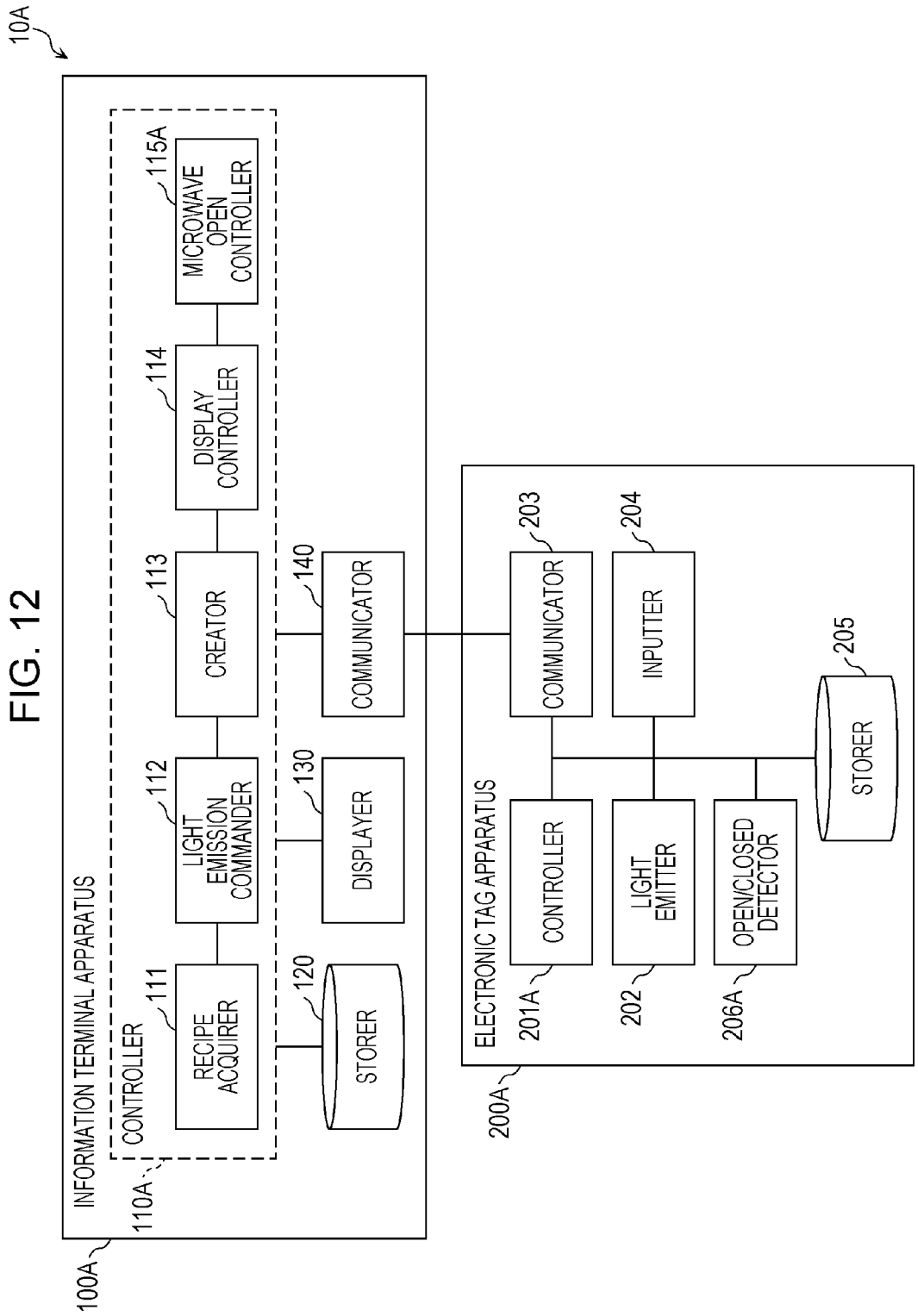
FIG. 12 is a block diagram of the functional structure of an information system in a second embodiment.

FIG. 12 is a block diagram of the functional structure of an information system 10A in the second embodiment. In FIG. 12, constituent elements that are essentially identical to constituent elements illustrated in FIG. 2 are assigned identical reference numerals and descriptions of these constituent elements in FIG. 12 will be appropriately omitted. As illustrated in FIG. 12, the information system 10A has an information terminal apparatus 100A and an electronic tag apparatus 200A attached to the cover of a food container.

Functional Structure of the Information Terminal Apparatus

First, the functional structure of the information terminal apparatus 100A will be described. The information terminal apparatus 100A has a controller 110A, the storer 120, the displayer 130, and the communicator 140. In addition to the recipe acquirer 111, light emission commander 112, creator 113, and display controller 114, the controller 110A has a microwave oven controller 115A.

The microwave oven controller 115A decides whether the second slide displayed on the displayer 130 is a second slide representing a second task involving the heating of an intermediate foodstuff in a microwave oven. If the second slide displayed on the displayer 130 is a second slide representing a second task involving the heating of an intermediate foodstuff in a microwave oven, the microwave oven controller 115A further decides whether the cover of the food container in which the intermediate foodstuff corresponding to the second task is stored is open. For example, the microwave oven controller 115A receives, from the electronic tag apparatus 200A through the communicator 140, information indicating the open or closed state of the cover, and decides whether the cover of the food container is open or closed according to the received information.

If the cover of the food container is closed, the microwave oven controller 115A prohibits the intermediate foodstuff from being heated in a microwave oven. If the cover of the food container is open, the microwave oven controller 115A permits the intermediate foodstuff to be heated in the microwave oven. Whether to prohibit or allow the heating of the intermediate foodstuff in a microwave oven is controlled according to, for example, a control message transmitted from the information terminal apparatus 100A to the microwave oven.

Functional Structure of the Electronic Tag Apparatus

Next, the functional structure of the electronic tag apparatus 200A attached to the cover of a food container will be described. In addition to a controller 201A, the light emitter 202, the communicator 203, the inputter 204, and the storer 205, the electronic tag apparatus 200A has an open/closed detector 206A.

The open/closed detector 206A, which is implemented by, for example, an open/closed sensor, detects the open or closed state of the cover of a food container. Although there is no particular limitation on the open/closed sensor, it is a physical switch that is turned on and off according to whether the cover is closed or opened.

The controller 201A has the functions of the controller 201 in the first embodiment. In addition, the controller 201A transmits, to the information terminal apparatus 100A through the communicator 203, information indicating that the open/closed state, detected by the open/closed detector 206A, of the cover of the food container.

Operation of the Information System

Next, processing by the information system 10A structured as described above will be described. Pre-preparation for cooking is essentially the same as in the first embodiment, so drawings and explanations about pre-preparation for cooking will be omitted.

Finish in Cooking

Figure 13:
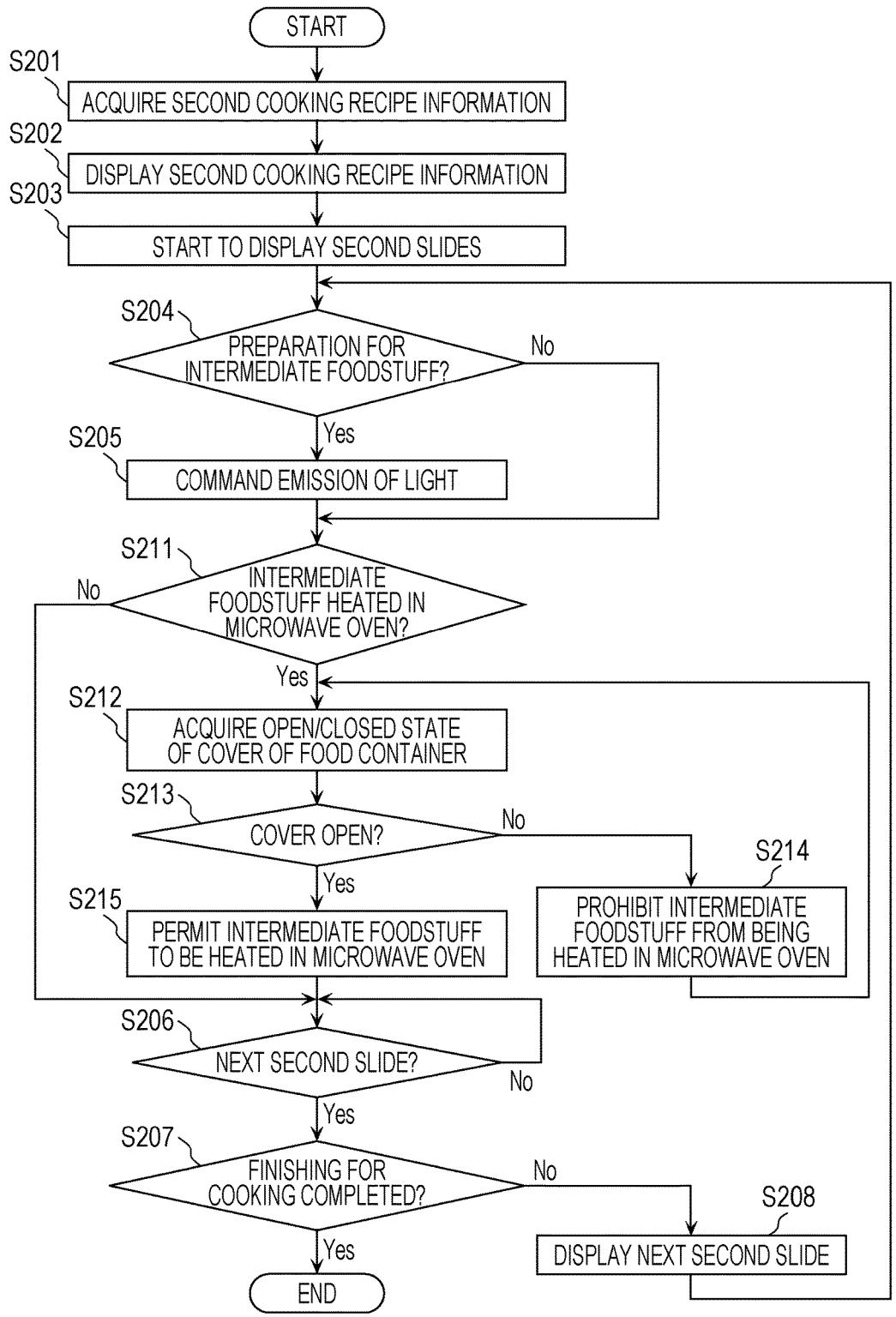
FIG. 13 is a flowchart illustrating processing executed by the information terminal apparatus in the second embodiment in the finish of cooking.

FIG. 13 is a flowchart illustrating processing executed by the information terminal apparatus 100A in the second embodiment in the finish of cooking. In FIG. 13, steps that are essentially identical to steps in FIG. 8 are assigned identical step numbers and descriptions of these steps in FIG. 13 will be appropriately omitted.

If the displayed slide is a not preparation slide (the result in S204 is No) or after a light emitting command has been transmitted in step S205, the microwave oven controller 115A decides whether the second slide displayed on the displayer 130 is a second slide representing a second task involving the heating of an intermediate foodstuff in a microwave oven (S211). For example, the microwave oven controller 115A references attribute information that has been set in advance for each of a plurality of second slides to decide whether the second slide displayed on the displayer 130 is a second slide representing a second task involving the heating of an intermediate foodstuff in a microwave oven.

If the second slide displayed on the displayer 130 is a second slide representing a second task involving the heating of an intermediate foodstuff in a microwave oven (the result in S211 is Yes), the microwave oven controller 115A receives, from the electronic tag apparatus 200A through the communicator 140, information indicating the open/closed state of the cover of the food container (S212).

The microwave oven controller 115A decides whether the cover of the food container is open or closed according to the information received from the electronic tag apparatus 200A (S213). If the cover of the food container is closed (the result in S213 is No), the microwave oven controller 115A prohibits the intermediate foodstuff from being heated in the microwave oven (S214). In this case, for example, the microwave oven controller 115A transmits, to the microwave oven through the communicator 140, a control message indicating the prohibition of heating. Alternatively, for example, the microwave oven controller 115A may transmit, to the electronic tag apparatus 200A through the communicator 140, third command information indicating a command that commands the emission of light in a predetermined color. In this case, the microwave oven prohibits heating when it detects the predetermined color.

If the cover of the food container is open (the result in S213 is Yes), the microwave oven controller 115A permits the intermediate foodstuff to be heated in the microwave oven (S215). In this case, for example, the microwave oven controller 115A may transmit, to the microwave oven through the communicator 140, a control message indicating the permission of heating or may do nothing.

Effects

As described above, in the information system 10A in this embodiment, the electronic tag apparatus 200A is attached to the cover of a food container in which an intermediate foodstuff can be stored; the information terminal apparatus 100A further has the microwave oven controller 115A that decides, when information about a second task involving the heating of an intermediate foodstuff in a microwave oven is displayed on the displayer 130, whether the cover of the food container is open or closed, and if the cover of the food container is closed, prohibits the intermediate foodstuff from being heated in the microwave oven.

In this structure, it is possible to prevent an intermediate foodstuff stored in a food container from being heated in a microwave oven in a state in which the electronic tag apparatus 200 is attached. Therefore, it is possible to prevent the electronic tag apparatus 200 from being destroyed by electromagnetic waves from the microwave oven.

Third Embodiment

Next, a third embodiment will be described. An electronic tag apparatus in this embodiment has a foodstuff detector instead of the inputter. The functional structure of this type of electronic tag apparatus will be described with reference to FIG. 14.

Figure 14:
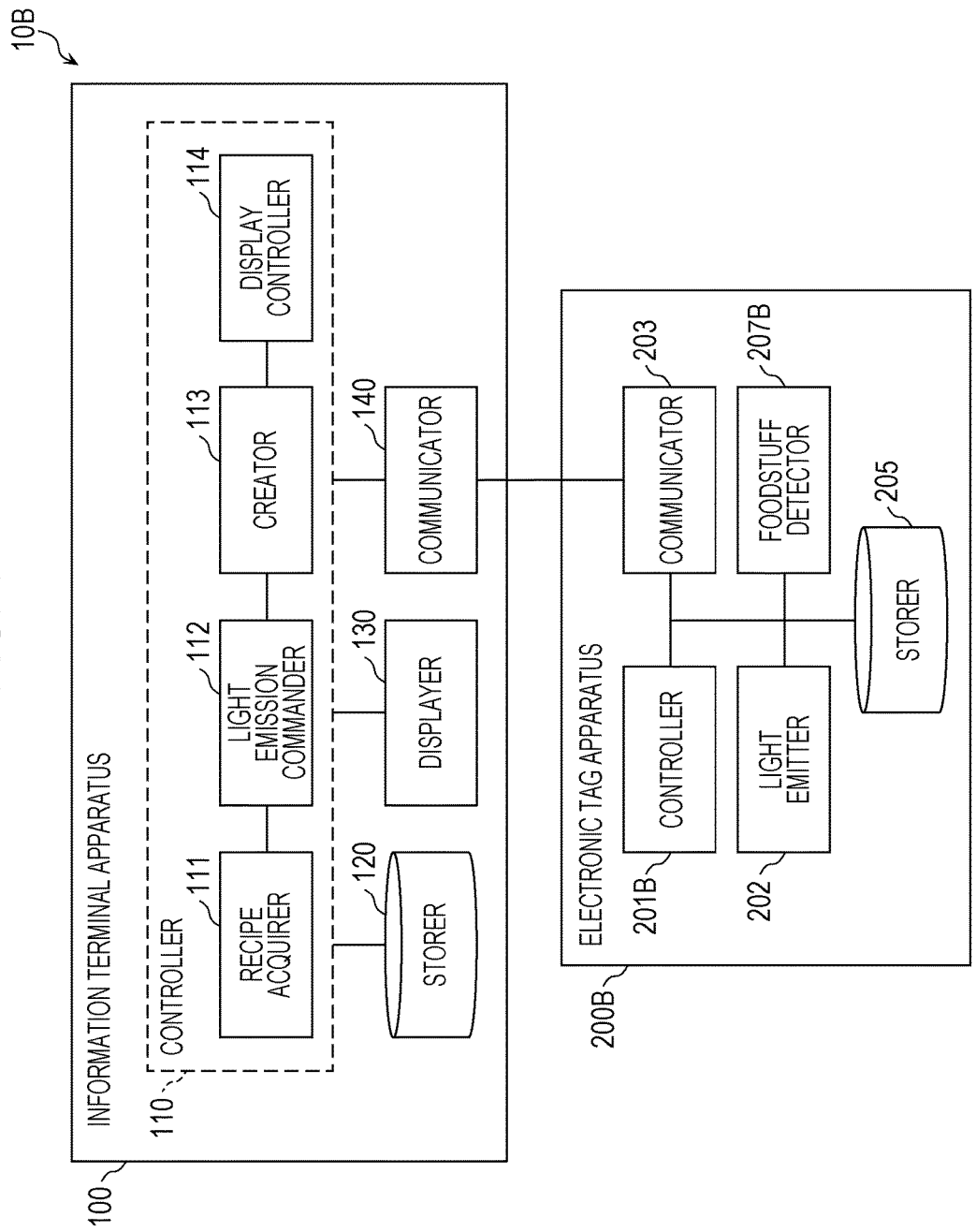
FIG. 14 is a block diagram of the functional structure of an information system in a third embodiment.

FIG. 14 is a block diagram of the functional structure of an information system 10B in the third embodiment. In FIG. 14, constituent elements that are essentially identical to constituent elements illustrated in FIG. 2 are assigned identical reference numerals and descriptions of these constituent elements in FIG. 14 will be appropriately omitted.

The information system 10B has the information terminal apparatus 100 and an electronic tag apparatus 200B. The electronic tag apparatus 200B has a controller 201B, the light emitter 202, the communicator 203, the storer 205, and a foodstuff detector 207B.

The foodstuff detector 207B detects a foodstuff (intermediate foodstuff) stored in a food container. The foodstuff detector 207B is implemented by, for example, an information processing method. If the food container is translucent, when a foodstuff is stored in the food container, illumination in the food container is lowered. If the illumination measured by an illumination sensor in the food container is lower than an illumination threshold, the foodstuff detector 207B detects that a foodstuff is stored in the food container. It suffices to determine the illumination threshold empirically or experimentally. Alternatively, the foodstuff detector 207B may be implemented by a light source and a photodetector. In this case, the foodstuff detector 207B may detect reflection of light emitted from the light source into the food container to detect whether a foodstuff (intermediate foodstuff) is stored in the food container.

When the foodstuff detector 207B detects a foodstuff, the controller 201B reads out identification information from the storer 205 and transmits the read-out identification information to the information terminal apparatus 100 through the communicator 203. When the foodstuff detector 207B detects a foodstuff, the controller 201 may stop the light emitter 202 from emitting light.

Effects

As described above, in the information system 10B in this embodiment, the electronic tag apparatus 200B is attached to a food container in which an intermediate foodstuff can be stored; the electronic tag apparatus 200B further has the foodstuff detector 207B that detects an intermediate foodstuff stored in the food container; when the foodstuff detector 207B detects that an intermediate foodstuff has been stored in the food container, the controller 201B transmits identification information to the information terminal apparatus 100 through the communicator 203.

In this structure, when the foodstuff detector 207B detects that an intermediate foodstuff has been stored in the food container, the controller 201B can transmit identification information to the information terminal apparatus 100. Therefore, even if the user does not operate a button or the like, when an intermediate foodstuff is stored in a food container, the electronic tag apparatus 200B can transmit identification information to the information terminal apparatus 100. This can improve the user's convenience and enables more accurate correspondence information to be prepared.

The foodstuff detector 207B in the information system 10B in this embodiment measures illumination in a food container. If the measured illumination is lower than an illumination threshold, the foodstuff detector 207B detects that an intermediate foodstuff stored in the food container.

In this structure, it is possible to easily detect an intermediate foodstuff in a food container according to illumination in the food container.

Fourth Embodiment

Next, a fourth embodiment will be described. In this embodiment, an electronic tag apparatus is implemented by a so-called radio frequency identifier (RFID). When the identification information of an intermediate foodstuff or process is written to the electronic tag apparatus, the intermediate foodstuff and food container are associated with each other. The fourth embodiment will be specifically described below, focusing on differences from the first to third embodiments above.

Structure of an Information System

Figure 15:
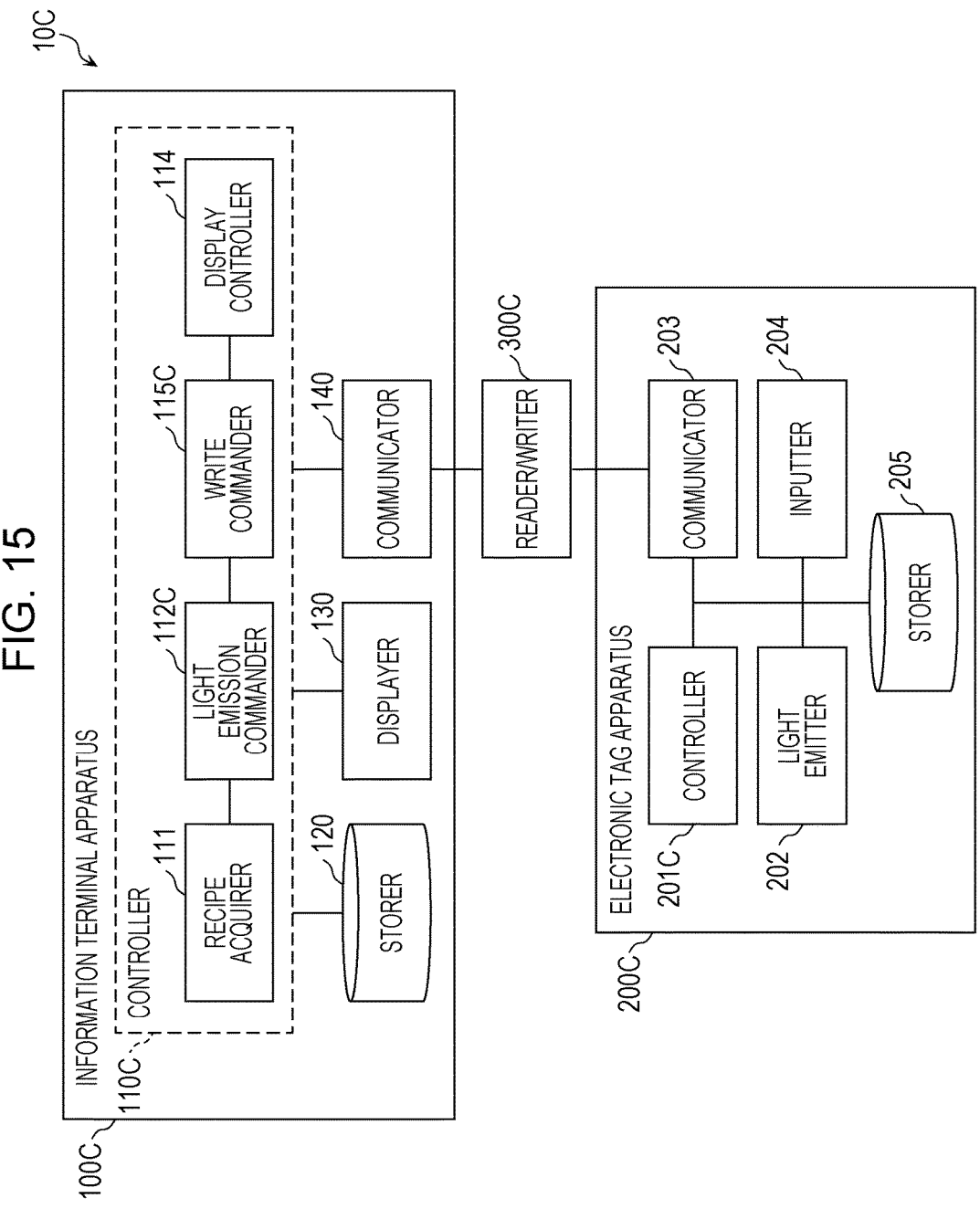
FIG. 15 is a block diagram of the functional structure of an information system in a fourth embodiment.

FIG. 15 is a block diagram of the functional structure of an information system 10C in the fourth embodiment. In FIG. 15, constituent elements that are essentially identical to constituent elements illustrated in FIG. 2 are assigned identical reference numerals and descriptions of these constituent elements in FIG. 15 will be appropriately omitted. As illustrated in FIG. 15, the information system 10C has an information terminal apparatus 100C, an electronic tag apparatus 200C, and a reader/writer 300C.

The information terminal apparatus 100C has a controller 110C, the storer 120, the displayer 130, and the communicator 140. The controller 110C has the recipe acquirer 111, a light emission commander 112C, the display controller 114, and a write commander 115C.

The light emission commander 112C commands the electronic tag apparatus 200 to emit light. When, for example, information, displayed on the displayer 130, about an intermediate foodstuff is touched in the finish of cooking, the light emission commander 112C transmits command information including the identification information of the intermediate foodstuff to the electronic tag apparatus 200C through the reader/writer 300C.

The write commander 115C transmits, to the reader/writer 300C through the communicator 140, associating information including the identification information of a process or the identification information of an intermediate foodstuff made in the process together with a command to write the identification information. When, for example, information, displayed on the displayer 130, about an intermediate foodstuff is touched in pre-preparation for cooking, the write commander 115C transmits the command to write the identification information of the intermediate foodstuff to the electronic tag apparatus 200C through the reader/writer 300C.

The reader/writer 300C transmits the identification information of a process or the identification information of an intermediate foodstuff made in the process to the electronic tag apparatus 200C, in response to a write command received from the information terminal apparatus 100C. For example, the reader/writer 300C can be incorporated in a refrigerator and can transmit identification information to the electronic tag apparatus 200C disposed in the refrigerator or in the vicinity of the refrigerator. The reader/writer 300C may be attached to the outside of a refrigerator, may be attached to a food storage box other than a refrigerator, or may be disposed in the vicinity of a refrigerator or food storage box in a range within which the reader/writer 300C can communicate with the electronic tag apparatus 200C.

The electronic tag apparatus 200C has a controller 201C, the light emitter 202, the communicator 203, the inputter 204, and the storer 205. The electronic tag apparatus 200C is, for example, an active adapter equipped with a power supply (not illustrated).

When the inputter 204 is operated, the controller 201C stores identification information received from the reader/writer 300C in the storer 205. Specifically, if the inputter 204 is operated within a predetermined time after a write command has been received, for example, the controller 201C writes identification information to the storer 205. If the inputter 204 is not operated within the predetermined time, the controller 201C discards the write command.

In addition, upon the receipt of a light emitting command including identification information, the controller 201C reads out identification information stored in the storer 120 and compares the received identification information with the read-out identification information. If there is a match between the received identification information and the read-out identification information, the controller 201C causes the light emitter 202 to emit light.

Operation of the Information System

Next, processing by the information system 10C structured as described above will be described.

Pre-Preparation for Cooking

First, processing executed by the information terminal apparatus 100C and electronic tag apparatus 200C in pre-preparation for cooking will be described with reference to FIGS. 16 and 17. In this embodiment, a case will be described in which the user performs pre-preparation for cooking with reference to first cooking recipe information or first cooking recipe information without slides being sequentially displayed.

Figure 16:
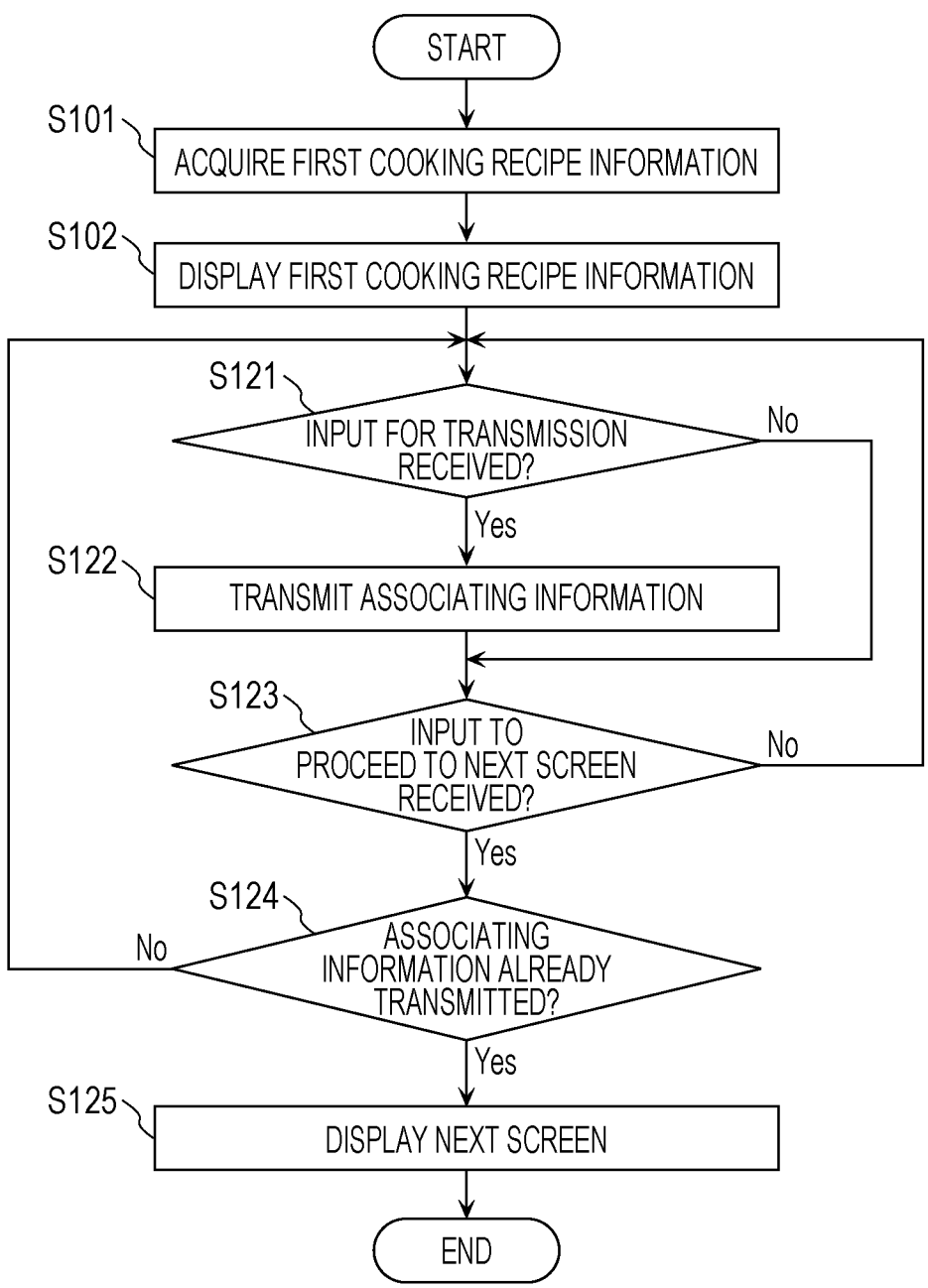
FIG. 16 is a flowchart illustrating processing executed by an information terminal apparatus in the fourth embodiment in pre-preparation for cooking.
Figure 17:
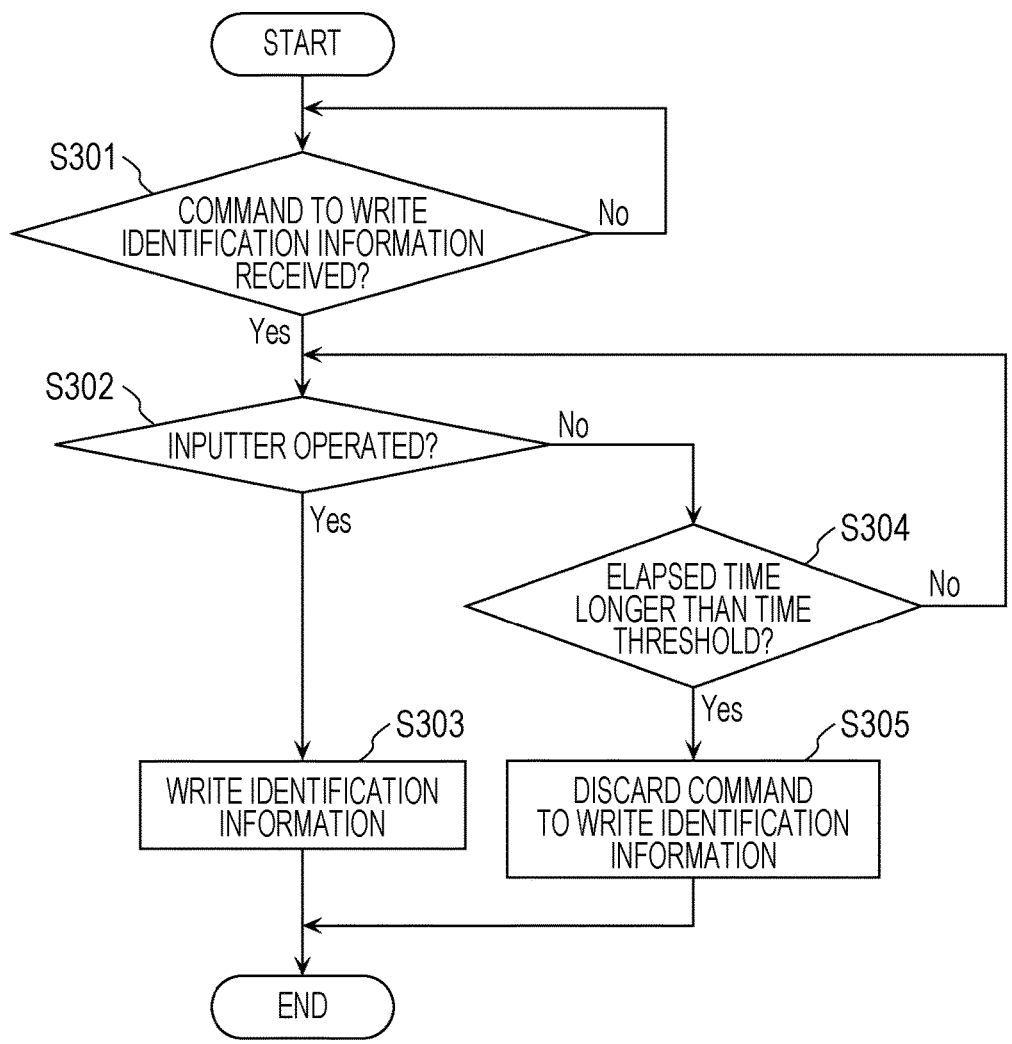
FIG. 17 is a flowchart illustrating processing executed by an electronic tag apparatus in the fourth embodiment in pre-preparation for cooking.

FIG. 16 is a flowchart illustrating processing executed by the information terminal apparatus 100C in the fourth embodiment in pre-preparation for cooking. In FIG. 16, constituent elements that are essentially identical to constituent elements illustrated in FIG. 4 are assigned identical reference numerals and descriptions of these constituent elements in FIG. 16 will be appropriately omitted.

After first cooking recipe information has been displayed (S102), the write commander 115C decides whether an input to transmit associating information has been received (S121). For example, the write commander 115C decides whether an image 504 of an intermediate foodstuff has been operated (touched or clicked, for example) on the screen of the first cooking recipe information 500 in FIG. 5.

If an input to transmit associating information has been received (the result in S121 is Yes), the write commander 115C transmits associating information including the identification information of a process or the identification information of an intermediate foodstuff made in the process together with a command to write the identification information (S122). If an input to transmit associating information has not been received (the result in S121 is No), step S122 is skipped.

Then, the controller 110C decides whether an input to proceed to a next screen has been received (S123). The input to proceed to a next screen is, for example, an operation for a GUI component displayed on the displayer 130.

If an input to proceed to a next screen has not been received (the result in S123 is No), the controller 110C returns to step S121. If an input to proceed to a next screen has been received (the result in S123 is Yes), the controller 110C decides whether associating information has been transmitted (S124). If associating information has not been transmitted (the result in S124 is No), the controller 110C returns to step S121. Thus, a transition to a next screen displayed after the currently displayed first cooking process information is prohibited until associating information is transmitted. If associating information has been transmitted (the result in S124 is Yes), the display controller 114 displays a next screen on the displayer 130 (S125).

Next, processing by the electronic tag apparatus 200C in pre-preparation for cooking will be described. FIG. 17 is a flowchart illustrating processing executed by the electronic tag apparatus 200C in the fourth embodiment in pre-preparation for cooking.

The controller 201C decides whether a command to write the identification information of a process or the identification information of an intermediate foodstuff made in the process has been received (S301). If a command to write the identification information has not been received (the result in S301 is No), the controller 201C repeats processing in step S301. If a command to write the identification information has been received (the result in S301 is Yes), the controller 201C decides whether the inputter 204 has been operated (S302). For example, the controller 201C decides whether an approval button has been pressed.

If the inputter 204 has been operated (the result in S302 is Yes), the controller 201C writes the identification information to the storer 205 (S303). Thus, the intermediate foodstuff and the food container in which the intermediate foodstuff is stored are associated with each other.

If the inputter 204 has not been operated (the result in S302 is No), the controller 201C decides whether an elapsed time from the reception of the identification information is longer than a time threshold (S304). The time threshold can be determined according to a time taken to store the identification information in the food container. It suffices to determine the time threshold empirically or experimentally.

If the elapsed time is not longer than the time threshold (the result in S304 is No), the controller 201C returns to step S302. If the elapsed time is longer than the time threshold (the result in S304 is Yes), the controller 201C discards the command to write the identification information (S305).

Finish in Cooking

Next, processing executed by the information terminal apparatus 100C and electronic tag apparatus 200C in the finish of cooking will be described with reference to FIGS.

18 to 19. In this embodiment, a case will be described in which the user finishes cooking with reference to first cooking process information or second cooking process information without slides being sequentially displayed.

Figure 18:
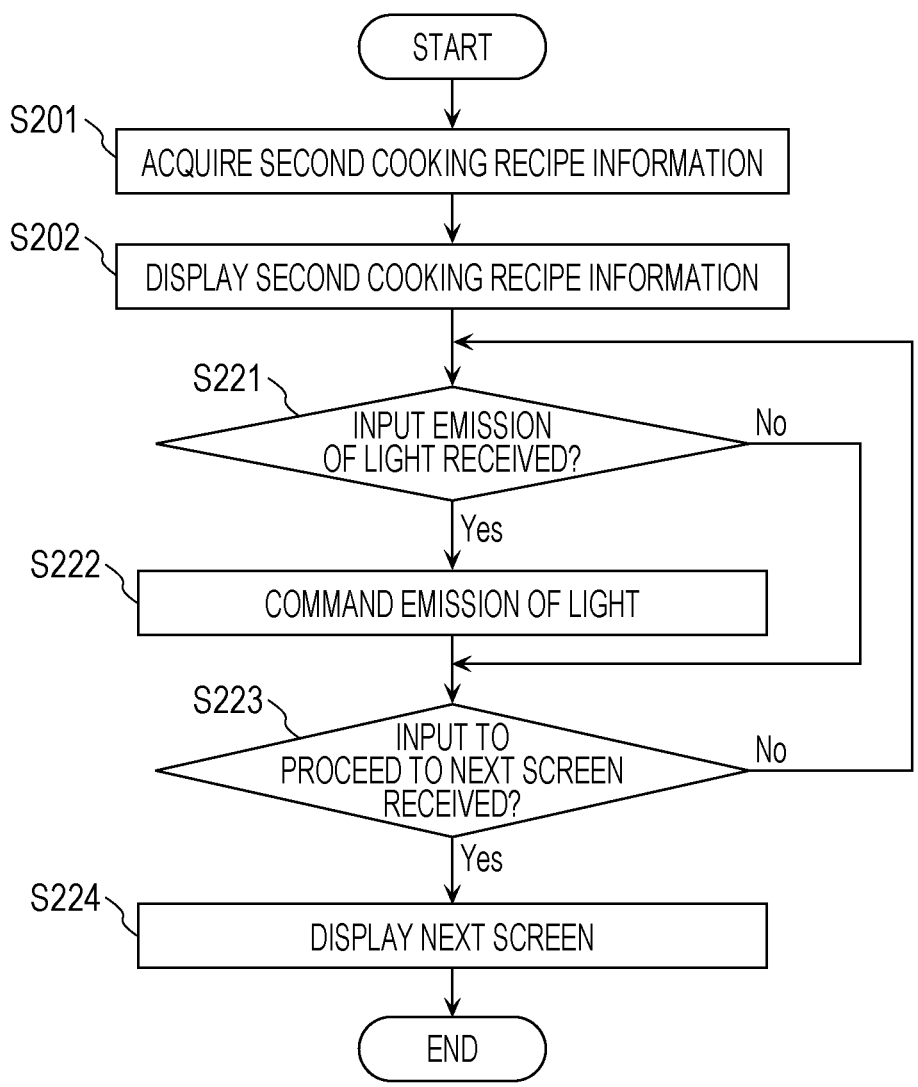
FIG. 18 is a flowchart illustrating processing executed by the information terminal apparatus in the fourth embodiment in the finish of cooking.

FIG. 18 is a flowchart illustrating processing executed by the information terminal apparatus 100C in the fourth embodiment in the finish of cooking.

After second cooking recipe information has been displayed (S202), the light emission commander 112C decides whether an input to cause the electronic tag apparatus 200C to emit light has been received (S221). For example, the light emission commander 112C decides whether information 904 about an intermediate foodstuff used in finish cooking has been operated (touched or clicked, for example) on the screen of the second cooking recipe information 900 in FIG. 9.

If an input to cause the electronic tag apparatus 200C to emit light has been received (the result in S221 is Yes), the light emission commander 112C transmits light emitting command information including the identification information of a process or the identification information of an intermediate foodstuff to be used in the process (S222). If an input to cause the electronic tag apparatus 200C to emit light has not been received (the result in S221 is No), step S222 is skipped.

Next, the controller 110C decides whether an input to proceed to a next screen has been received (S223). If an input to proceed to a next screen has not been received (the result in S223 is No), the controller 110C returns to step S221. If an input to proceed to a next screen has been received (the result in S223 is Yes), the display controller 114 displays the next screen on the displayer 130 (S224).

Figure 19:
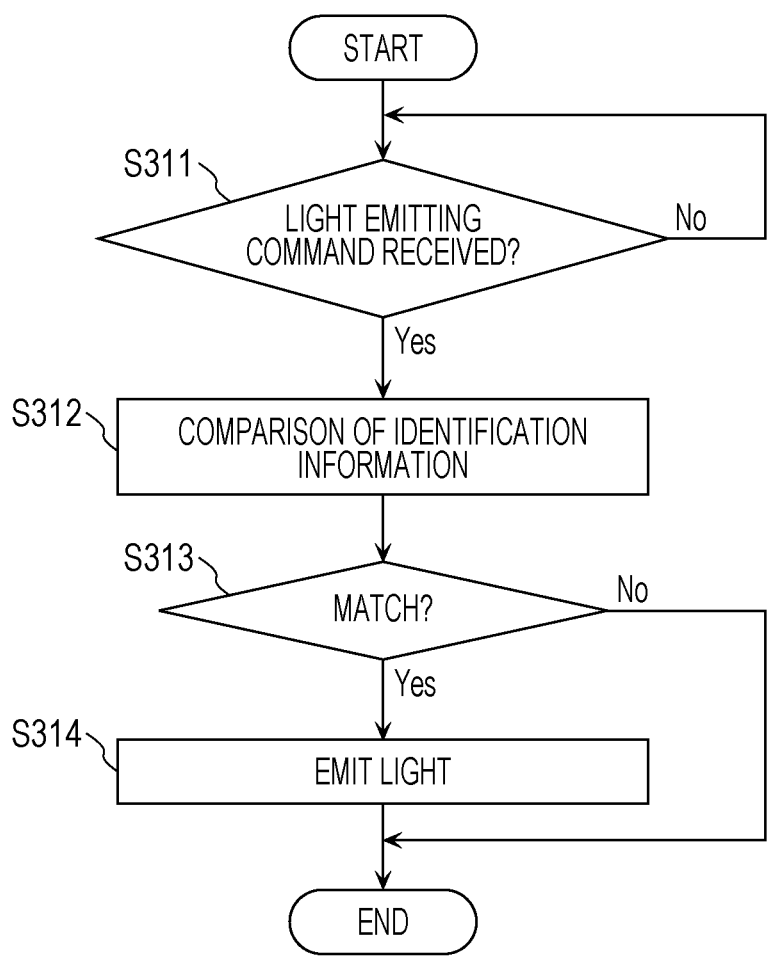
FIG. 19 is a flowchart illustrating processing executed by the electronic tag apparatus in the fourth embodiment in the finish of cooking.

Next, processing by the electronic tag apparatus 200C in the finish of cooking will be described. FIG. 19 is a flowchart illustrating processing executed by the 200C in the fourth embodiment in the finish of cooking.

The controller 201C decides whether light emitting command information including identification information has been received (S311). If light emitting command information has not been received (the result in S311 is No), the controller 201C repeats processing in step S311. If light emitting command information has been received (the result in S311 is Yes), the controller 201C compares the received identification information with identification information stored in the storer 205 (S312). If there is a match between the received identification information and the identification information stored in the storer 205 (the result in S313 is Yes), the controller 201C causes the light emitter 202 to emit light (S314).

Effects

As described above, in the information system 10C in this embodiment, associating information includes first identification information, which is the identification information of a first process or the identification information of an intermediate foodstuff made in the first process. The first identification information is transmitted together with a command to write the first identification information.

In this structure, when the first identification information is written to the electronic tag apparatus 200C, the first process or intermediate foodstuff and a food container are associated with each other, enabling the intermediate foodstuff to be easily managed. As a result, a load on a cook who manages intermediate foodstuffs can be reduced and cooking can be efficiently supported by using correspondence between the first process or intermediate foodstuff and the food container.

Other Embodiments

So far, information systems in one or a plurality of aspects of the present disclosure have been described according to embodiments. However, the present disclosure is not limited to these embodiments. The range of one or a plurality of aspects may include embodiments in which various variations that a person having ordinary skill in the art thinks of are applied to the embodiments described above and may also include embodiments in which constituent elements in different embodiments are combined, without departing from the intended scope of the present disclosure.

For example, although, in the above embodiments, a first slide of a task to make an intermediate foodstuff and a first slide of a task to store the intermediate foodstuff have been different slides, these slides may be combined into a single slide. In this case, the light emission commander in the information terminal apparatus only needs to transmit first command information to the electronic tag apparatus after the elapse of a predetermined time from the display of a slide. In addition, when the first command information is transmitted, the display controller in the information terminal apparatus may display, on the displayer, notification information that prompts the user to store an intermediate foodstuff in the food container. The notification information may be displayed on a first slide as a popup for example. This can prompt the user to store an intermediate foodstuff in the food container and thereby can suppress the user from forgetting to store an intermediate foodstuff.

If the cover of the food container is closed in the second embodiment above, the heating of the intermediate foodstuff in a microwave oven has been prohibited. In addition to this, the light emitter 202 may emit light and a warning may be displayed on the displayer 130 or microwave oven.

For example, while the cover of the food container is closed in the second embodiment above, the light emission commander 112 may transmit, to the electronic tag apparatus 200A through the communicator 140, third command information indicating a command that causes the light emitter 202 to emit light. Alternatively, for example, while the cover of the food container is closed in the second embodiment above, the display controller 114 may display, on the displayer 130, a notification that prompts the user to open the cover. Alternatively, for example, while the cover of the food container is closed in the second embodiment above, the microwave oven controller 115A may transmit, to the microwave oven through the communicator 140, information that causes the microwave oven to display, on it, a notification that prompts the user to open the cover. Due to the information or notification described above, it is possible to prompt the user to open the cover and can thereby prevent the electronic tag apparatus 200B from being destroyed when an intermediate foodstuff is heated in the microwave oven.

Although, in the above embodiments, the electronic tag apparatus has had a light emitter, this is not a limitation. For example, the electronic tag apparatus may have a mark that identifies the electronic tag apparatus, the mark being attached to the electronic tag apparatus, instead of the light emitter. In this case, if information about a second task involving preparation for an intermediate foodstuff is displayed on the displayer, the information terminal apparatus may display the mark on the displayer instead of transmitting second command information. In addition, the electronic tag apparatus may have a voice outputer instead of the light emitter. In this case, the information terminal apparatus only need to transmit, to the electronic tag apparatus, command information that commands voice to be output, instead of command information that commands light emission.

In the third embodiment above, the foodstuff detector 207B may detect an intermediate foodstuff by detecting its temperature. In this case, the display controller 114 in the information terminal apparatus 100 can also display command information on the displayer 130 according to the temperature detected by the foodstuff detector 207B. For example, when the temperature of an intermediate foodstuff falls below a temperature threshold, the display controller 114 may display information indicating a command to place the food container in the refrigerator. It suffices to determine the temperature threshold empirically or experimentally.

Although, in the third embodiment above, a result of the detection of an intermediate foodstuff by the foodstuff detector 207B has been used in pre-preparation for cooking, the result may be used in the finish of cooking. For example, the user may be notified of a warning when an attempt is made to proceed to a next screen occurs in a state in which the intermediate foodstuff has not yet been taken out of the food container.

Although, in the above embodiments, cases in which the information system has only one electronic tag apparatus have been described, the information system may have a plurality of electronic tag apparatuses attached to a plurality of food containers. Even in these cases, it is possible to associate the plurality of electronic tag apparatuses and the plurality of food containers with each other by using the correspondence table 120a in FIG. 3.

Although, in the first to third embodiments above, a plurality of slides, each of which represents an individual task, have been sequentially displayed, slides are not necessarily displayed. For example, first cooking process information included in first cooking recipe information and second cooking process information included in second cooking recipe information may be displayed. By contrast, although, in the fourth embodiment above, only first and second cooking recipe information or first and second cooking process information has been displayed without slides being displayed, slides may be sequentially displayed.

The correspondence table 120a is just an example of correspondence information; correspondence information is not limited to the correspondence table 120a. Correspondence information is not necessarily represented in a tabular form.

Although, in the third embodiment above, a case has been described in which the electronic tag apparatus 200B is active, the electronic tag apparatus 200B may be passive. In this case, after an intermediate foodstuff has been stored in a food container, for example, identification information may be written to the electronic tag apparatus 200B when the food container to which the electronic tag apparatus is attached 200B is placed in the vicinity of a reader/writer. The reader/writer may be attached to, for example, a measuring instrument that measures the weight of the intermediate foodstuff. In this case, the electronic tag apparatus 200B may not have a button (inputter).

In the third embodiment above, heating in a microwave oven has been prohibited according to a result of a decision as to whether the cover is open. Another decision may be further made as to whether the electronic tag apparatus 200B is present in the microwave oven. If the electronic tag apparatus 200B is present in the microwave oven, it suffices to prohibit heating in the microwave oven. A decision as to whether the electronic tag apparatus 200B is present in the microwave oven may be made by, for example, detecting light emitted from the light emitter 202 in the electronic tag apparatus 200B. Alternatively, this decision may be made according to the intensity of a communication radio wave from the electronic tag apparatus 200B.

The electronic tag apparatus may manage the use-by date of an intermediate foodstuff. For example, the electronic tag apparatus may receive the use-by data of an intermediate foodstuff from the information terminal apparatus, and when the current date and time exceeds the use-by data, may cause the light emitter to emit light.

Although, in the above embodiments, the electronic tag apparatus has been attached to a food container for an intermediate foodstuff, the electronic tag apparatus may be attached to a seasoning case.

To prohibit an intermediate foodstuff from being heated in a microwave oven, the light emission commander 112 may transmit command information to the electronic tag apparatus 200 through the communicator 140. In addition, to prohibit an intermediate foodstuff from being heated in a microwave oven, the display controller 114 may display, on the displayer 130, a notification that prompts the user to open the cover.

Although, in the above embodiments, the information terminal apparatus has displayed a plurality of slides, the information terminal apparatus may output the contents of the slides in the form of voice.

Although, in the above embodiments, the buttons 603, 703, 1003, or 1103 displayed on the displayer 130 has been operated to proceed to a next screen, a voice input may be made to proceed to a next slide.

In the above embodiments, some of the constituent elements of the information terminal may be provided in a server apparatus connected to the information terminal through a communication network. The server apparatus may be implanted by, for example, cloud computing.

In the above embodiments, part or all of the functions of the information terminal and electronic tag apparatus may be implemented by special electronic circuits or a computer including a processor and a memory. An example of this type of computer will be described with reference to FIG. 20.

Figure 20:
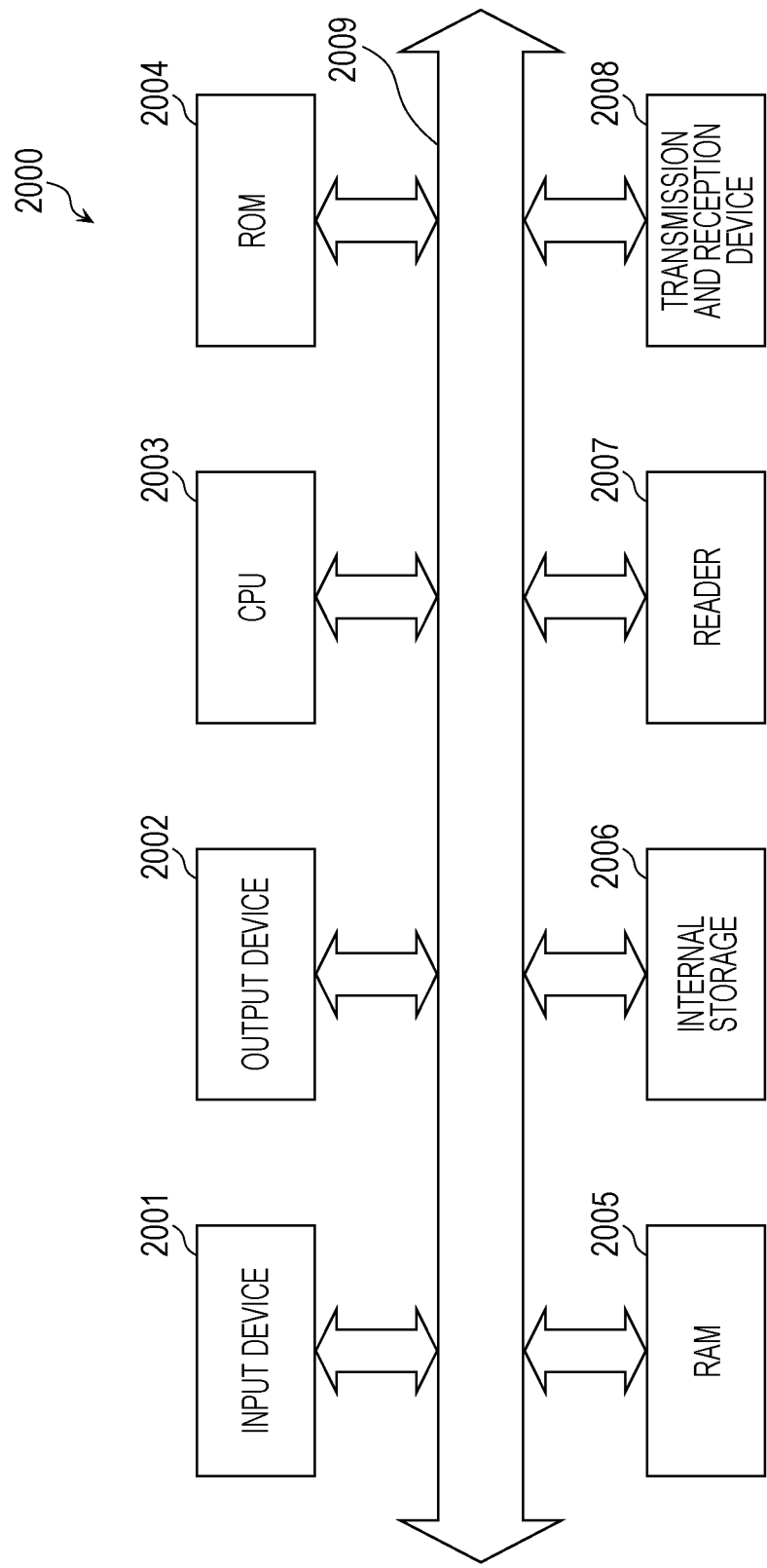
FIG. 20 illustrates an example of the hardware structure of a computer that uses software to implements the functions of the apparatuses in the above embodiments.

FIG. 20 illustrates an example of the hardware structure of a computer 2000 that uses software to implements the functions of the apparatuses in the above embodiments. As illustrated in FIG. 20, the computer 2000 has an input device 2001 such as a keyboard, input buttons or a touch pad, an output device 2002 such as a display or a speaker, a central processing unit (CPU) 2003, a read-only memory (ROM) 2004, and a random-access memory (RAM) 2005. The computer 2000 also has an internal storage 2006 such as a NAND-type flash memory, a reader 2007 that reads information from storage media such as a digital versatile disk ROM (DVD-ROM) and a universal serial bus (USB) memory, and a transmission and reception device 2008 that performs communication through a network. These constituent elements are mutually connected by a bus 2009. As far as smart phones and the like are concerned, the internal storage 2006 is sometimes called a ROM.

The reader 2007 reads programs that implement the functions of the controllers in the above embodiments from a recording medium in which these programs are recorded, after which the reader 2007 stores the read programs in the internal storage 2006. Alternatively, the transmission and reception device 2008 downloads the programs from the server apparatus connected to the network and stores the downloaded programs in the internal storage 2006. Alternatively, the programs are recoded in advance in the internal storage 2006.

The CPU 2003 copies the programs stored in the internal storage 2006 to the RAM 2005, sequentially reads out instructions included in the programs from the RAM 2005, and executes the read-out instructions, implementing the functions of the functional components included in each apparatus described above. In program execution, information obtained in various types of processing described in the embodiments is stored in the RAM 2005 or internal storage 2006 and is appropriately used.

The information processing method and recording medium of the present disclosure can be used in a management system for intermediate foodstuffs used in cooking.

What is claimed is:

1. An information processing method comprising causing a processor in an information terminal to
    display, on a display of the information terminal, a first display screen presenting a first instruction to store an intermediate foodstuff prepared in a preparation process included in a plurality of cooking processes, in a target food container,
    read out, from a memory storing identification information corresponding to each of a plurality of food containers, target identification information corresponding to the target container, wherein the target identification information is not associated with information indicating a foodstuff and the cooking processes in the memory,
    transmit a command, in conjunction with the first display screen, to an electronic tag apparatus attached to the target food container corresponding to the target identification information, the command causing the electronic tag apparatus to perform an operation to allow a user to discriminate the target food container,
    acquire, from the electronic tag apparatus, the target identification information after the intermediate foodstuff is stored in the target food container while the first display screen is displayed on the display,
    update the memory, such that (i) the target identification information is associated with foodstuff information or (ii) the target identification information is associated with process information, the foodstuff information indicating the intermediate foodstuff, and the process information indicating the preparation process,
    display, on the display, a second display screen presenting a second instruction to take the target food container storing the intermediate foodstuff which is to be cooked in a final process included in the plurality of cooking processes, and
    transmit the command, in conjunction with the second display screen, to the electronic tag apparatus according to the target identification information, when the second display screen is displayed.

2. The information processing method according to claim 1, wherein the command causes a light source provided in the electronic tag apparatus to emit light.

3. The information processing method according to claim 1, after causing the processor to transmit the command to the electronic tag apparatus according to the target identification information, the method further causing the processor to display, on the display, notification information that prompts the user to store the intermediate foodstuff in the target food container.

4. The information processing method according to claim 1, wherein:
    the electronic tag apparatus has an open/closed sensor that detects the open or closed state of a cover of the target food container; and
    when the sensor detects that the cover of the target food container has been closed, the target identification information is acquired from the electronic tag apparatus.

5. The information processing method according to claim 1, wherein: the electronic tag apparatus has an illumination sensor; and when illumination measured by the illumination sensor becomes equal to or higher than a predetermined threshold, the target identification information is acquired from the electronic tag apparatus.

6. The information processing method according to claim 1, wherein a transition from the first display screen to a next screen on the display is stopped until (i) the target identification information and the foodstuff information or (ii) the target identification information and the process information are stored in the memory.

7. A non-transitory recording medium recording a program that causes a processor in an information terminal to
    display, on a display of the information terminal, a first display screen presenting a first instruction to store an intermediate foodstuff prepared in a preparation process included in a plurality of cooking processes, in a target food container,
    read out, from a memory storing identification information corresponding to each of a plurality of food containers, target identification information corresponding to the target container, wherein the target identification information is not associated with information indicating a foodstuff and the cooking processes in the memory,
    transmit a command, in conjunction with the first display screen, to an electronic tag apparatus attached to the target food container corresponding to the target identification information, the command causing the electronic tag apparatus to perform an operation to allow a user to discriminate the target food container,
    acquire, from the electronic tag apparatus, the target identification information after the intermediate foodstuff is stored in the target food container while the first display screen is displayed on the display,
    update the memory, such that (i) the target identification information is associated with the foodstuff information or (ii) the target identification information is associated with process information, the foodstuff information indicating the intermediate foodstuff, and the process information indicating the preparation process,
    display, on the display, a second display screen presenting a second instruction to take the target food container storing the intermediate foodstuff which is to be cooked in a final process included in the plurality of cooking processes, and
    transmit the command, in conjunction with the second display screen, to the electronic tag apparatus according to the target identification information, when the second display screen is displayed.

8. An information processing method comprising causing a processor in an information terminal to
    display, on a display of the information terminal, a first display screen presenting a first recipe of how to prepare an intermediate foodstuff, the first recipe corresponding to a preparation process included in a plurality of cooking processes,
    display, on the display of the information terminal, a second display screen presenting a first instruction to store the intermediate foodstuff in a food container in which no foodstuff is stored, in conjunction with the second display screen, transmit, to an electronic tag apparatus attached to the food container in which the intermediate foodstuff is to be stored, a first command, foodstuff information indicating the intermediate foodstuff or process information indicating the preparation process while the second display screen is displayed on the display, the first command causing the electronic tag apparatus to store the foodstuff information or the process information, display, on the display of the information terminal, a third display screen presenting a second recipe of how to cook the intermediate foodstuff, the second recipe corresponding to a final process included in the plurality of cooking processes after the foodstuff information or the process information is stored in the electronic tag apparatus, display, on the display of the information terminal, a fourth display screen presenting a second instruction to take the food container storing the intermediate foodstuff which is to be cooked in the final process, and in conjunction with the fourth display screen, transmit a second command, the foodstuff information or the process information to the electronic tag apparatus while the fourth display screen is displayed on the display, the second command causing the electronic apparatus to allow a user to discriminate the food container in which the intermediate foodstuff is stored.

9. A non-transitory recording medium recording a program that causes a processor in an information terminal to display, on a display of the information terminal, a first display screen presenting a first recipe of how to prepare an intermediate foodstuff, the first recipe corresponding to a preparation process included in a plurality of cooking processes, display, on the display of the information terminal, a second display screen presenting a first instruction to store the intermediate foodstuff in a food container in which no foodstuff is stored in conjunction with the second display screen, transmit, to an electronic tag apparatus attached to the food container in which the intermediate foodstuff is to be stored, a first command, foodstuff information indicating the intermediate foodstuff or process information indicating the preparation process while the second display screen is displayed on the display, the first command causing the electronic tag apparatus to store the foodstuff information or the process information, display, on the display of the information terminal, a third display screen presenting a second recipe of how to cook the intermediate foodstuff, the second recipe corresponding to a final process included in the plurality of cooking processes after the foodstuff information or the process information is stored in the electronic tag apparatus, display, on the display of the information terminal, a fourth display screen presenting a second instruction to take the food container storing the intermediate foodstuff which is to be cooked in the final process, and in conjunction with the fourth display screen, transmit a second command, the foodstuff information or the process information to the electronic tag apparatus while the fourth display screen is displayed on the display, the second command causing the electronic apparatus to allow a user to discriminate the food container in which the intermediate foodstuff is stored.

* * * * *